United States Patent
Nagaosa

(10) Patent No.: US 10,202,049 B2
(45) Date of Patent: Feb. 12, 2019

(54) AIR-COOLED FUEL-CELL VEHICLE

(71) Applicant: TOYOTA JIDOSHA KABUSHIKI KAISHA, Toyota-shi, Aichi-ken (JP)

(72) Inventor: Hideo Nagaosa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/488,072

(22) Filed: Apr. 14, 2017

(65) Prior Publication Data
US 2017/0297450 A1     Oct. 19, 2017

(30) Foreign Application Priority Data

Apr. 18, 2016  (JP) ................................. 2016-083115

(51) Int. Cl.
*B60K 11/00* (2006.01)
*B60L 11/18* (2006.01)
(Continued)

(52) U.S. Cl.
CPC ........ *B60L 11/1892* (2013.01); *B60H 1/3229* (2013.01); *B60K 11/085* (2013.01);
(Continued)

(58) Field of Classification Search
CPC .............. B60L 11/1892; B60L 11/1896; B60L 11/1888; B60L 11/1898; B60L 11/18; B60K 11/085; B60K 11/08; B60K 11/06; B60K 11/00; B60W 30/08; B60H 1/3229; B60H 1/26; B60H 1/32; H01M 8/00; H01M 8/04014; H01M 8/04074; H01M 8/04007;
(Continued)

(56) References Cited

U.S. PATENT DOCUMENTS

| | | | |
|---|---|---|---|
| 7,108,092 B2 * | 9/2006 | Suwa ..................... | B60K 11/04 180/68.4 |
| 8,017,278 B2 * | 9/2011 | Yoshida ............. | B60H 1/00392 180/65.31 |

(Continued)

FOREIGN PATENT DOCUMENTS

| | | |
|---|---|---|
| JP | 2003-023705 A | 1/2003 |
| JP | 2007-191137 A | 8/2007 |

(Continued)

*Primary Examiner* — James M Dolak
(74) *Attorney, Agent, or Firm* — Hunton Andrews Kurth LLP

(57) ABSTRACT

An air-cooled fuel-cell vehicle includes: a drive motor for the vehicle; an air-cooled fuel cell; an intake duct which is placed on a vehicle front side relative to the fuel cell and guides air to the fuel cell; an air-intake shutter mechanism which opens and closes the intake duct; a storage chamber provided on the vehicle front side relative to a passenger compartment of the vehicle and accommodates the fuel cell, the intake duct, and the air-intake shutter mechanism; a controlling portion which controls the air-intake shutter mechanism; and a collision detector which detects a front collision of the vehicle. The controlling portion controls the air-intake shutter mechanism to a closed side when the front collision of the vehicle is detected, and the intake duct includes a tubular metal plate portion or a resin portion containing an elastomer component.

12 Claims, 20 Drawing Sheets

(51) Int. Cl.
*B60H 1/32* (2006.01)
*B60K 11/08* (2006.01)
*B60W 30/08* (2012.01)
*H01M 8/04014* (2016.01)

(52) U.S. Cl.
CPC .......... *B60L 11/1896* (2013.01); *B60W 30/08* (2013.01); *H01M 8/04014* (2013.01); *H01M 2250/20* (2013.01); *Y02T 10/88* (2013.01); *Y02T 90/32* (2013.01)

(58) Field of Classification Search
CPC ......... H01M 8/04313; H01M 8/04298; H01M 2250/20
See application file for complete search history.

(56) References Cited

U.S. PATENT DOCUMENTS

| | | | | |
|---|---|---|---|---|
| 8,824,876 | B2* | 9/2014 | Ohtsuka | B60K 1/04 180/68.1 |
| 8,863,871 | B2* | 10/2014 | Kobayashi | B60L 11/1896 180/65.31 |
| 8,967,308 | B2* | 3/2015 | Saito | B60K 11/085 180/68.1 |
| 8,985,259 | B2* | 3/2015 | Ozawa | B60K 1/04 180/292 |
| 9,281,533 | B2* | 3/2016 | Ozawa | B60K 1/04 |
| 9,705,140 | B2* | 7/2017 | Matsumoto | H01M 8/2484 |
| 10,040,344 | B2* | 8/2018 | Schoning | B60R 19/48 |
| 2013/0094842 | A1 | 4/2013 | Ohtsuka et al. | |
| 2013/0302720 | A1 | 11/2013 | Ozawa et al. | |
| 2013/0303070 | A1 | 11/2013 | Ozawa et al. | |
| 2013/0333964 | A1 | 12/2013 | Matsumoto et al. | |
| 2013/0341114 | A1 | 12/2013 | Ozawa et al. | |
| 2015/0147671 | A1 | 5/2015 | Matsumoto et al. | |

FOREIGN PATENT DOCUMENTS

| | | |
|---|---|---|
| JP | 2012-096587 A | 5/2012 |
| JP | 2012-183902 A | 9/2012 |
| JP | 2012-183909 A | 9/2012 |
| JP | 2012-218510 A | 11/2012 |
| JP | 2012-218554 A | 11/2012 |
| JP | 2013-256234 A | 12/2013 |
| WO | 2011/148927 A1 | 12/2011 |
| WO | 2013/161804 A1 | 10/2013 |

* cited by examiner

AIR-COOLED FUEL-CELL VEHICLE

INCORPORATION BY REFERENCE

The disclosure of Japanese Patent Application No. 2016-083115 filed on Apr. 18, 2016 including the specification, drawings and abstract is incorporated herein by reference in its entirety.

BACKGROUND

1. Technical Field

The present disclosure relates to an air-cooled fuel-cell vehicle.

2. Description of Related Art

There has been known an air-cooled fuel-cell vehicle configured such that an air-cooled fuel cell is accommodated in a storage chamber on a front side relative to a passenger compartment. The air-cooled fuel-cell vehicle includes an intake duct configured to guide external air to the fuel cell, and an exhaust duct configured to discharge the air passing through the fuel cell to the outside (see Japanese Patent Application Publication No. 2012-218554 (JP 2012-218554 A), for example).

When such an air-cooled fuel-cell vehicle has a front collision, a vehicle-side component or a foreign matter entering the storage chamber from the outside may collide with the fuel cell, so that the fuel cell may be damaged. Particularly, such a component or foreign matter may collide with the fuel cell through the intake duct or the exhaust duct, so that the fuel cell may be damaged.

SUMMARY

The present disclosure provides an air-cooled fuel-cell vehicle that restrains damage to a fuel cell at the time of a front collision.

An aspect of the present disclosure relates to an air-cooled fuel-cell vehicle including: a drive motor for the vehicle; an air-cooled fuel cell configured to supply electric power to the motor; an intake duct placed on a vehicle front side relative to the fuel cell and configured to guide air to the fuel cell; an air-intake shutter mechanism configured to open and close the intake duct; a storage chamber provided on the vehicle front side relative to a passenger compartment of the vehicle and configured to accommodate the fuel cell, the intake duct, and the air-intake shutter mechanism; a controlling portion configured to control the air-intake shutter mechanism; and a collision detector configured to detect a front collision of the vehicle. The controlling portion is configured to control the air-intake shutter mechanism to a closed side when the front collision of the vehicle is detected, and the intake duct includes a tubular metal plate portion or a resin portion containing an elastomer component.

In a case where the vehicle has a front collision, the air-intake shutter mechanism is controlled to the closed side, so it is possible to restrain a component or a foreign matter from entering the intake duct from the vehicle front side at the time of a front collision and colliding with the fuel cell, thereby making it possible to restrain damage of the fuel cell.

Further, the intake duct includes a tubular metal plate portion or a resin portion containing an elastomer component. Accordingly, at the time of a front collision, the intake duct is deformed, but breakage or crush is restrained in comparison with a case where the intake duct is made of only resin that does not contain the elastomer component. This restrains the intake dust from breaking and a component or a foreign matter from colliding with the fuel cell. Further, when a front collision occurs, the tubular metal plate portion or the resin portion containing the elastomer component is deformed, thereby restraining impact transmitted to the fuel cell.

The air-cooled fuel-cell vehicle may include: an exhaust duct through which the air passing through the fuel cell is discharged to an upper side relative to the fuel cell; and an air-exhaust shutter mechanism configured to open and close the exhaust duct. The storage chamber may accommodate the exhaust duct and the air-exhaust shutter mechanism, and the controlling portion may be configured to control the air-exhaust shutter mechanism to a closed side when the front collision of the vehicle is detected.

The air-cooled fuel-cell vehicle may include a transaxle configured to transmit power of the motor to wheels of the vehicle, the storage chamber may accommodate the motor and the transaxle, and an end portion, on the vehicle front side, of at least one of the motor and the transaxle may be placed on the vehicle front side relative to an end portion of the fuel cell on the vehicle front side.

The exhaust duct may include a tubular metal plate portion or a resin portion containing an elastomer component.

The air-cooled fuel-cell vehicle may include: a vehicle frame member constituting a framework of the vehicle; an upper mount mechanism configured to fix the fuel cell to the vehicle frame member; and a lower mount mechanism configured to fix the fuel cell to the vehicle frame member below the upper mount mechanism. The upper mount mechanism and the lower mount mechanism may fix the fuel cell in an inclined posture so that an upper part of the fuel cell is placed on the vehicle front side relative to a lower part of the fuel cell, and the lower mount mechanism may include a vulnerable portion configured to be broken more easily than the upper mount mechanism.

The air-cooled fuel-cell vehicle may include: a vehicle frame member constituting a framework of the vehicle; an upper mount mechanism configured to fix the fuel cell to the vehicle frame member; and a lower mount mechanism configured to fix the fuel cell to the vehicle frame member below the upper mount mechanism. The upper mount mechanism and the lower mount mechanism may fix the fuel cell in an inclined posture so that an upper part of the fuel cell is placed on the vehicle front side relative to a lower part of the fuel cell, the upper mount mechanism and the lower mount mechanism may include respective fastening bolts each configured to fasten a bracket fixed to a fuel-cell side member with a bracket fixed to the vehicle frame member, and when the vehicle is viewed from a vertical direction, an axial direction of the fastening bolt of the lower mount mechanism may be nearly parallel to a vehicle width direction of the vehicle as compared with an axial direction of the fastening bolt of the upper mount mechanism.

The metal plate portion of the intake duct or the resin portion of the intake duct may include a deformation promoting portion configured to be promoted to deform at a time when the vehicle has a front collision.

The air-cooled fuel-cell vehicle may include an air conditioner condenser accommodated in the storage chamber and configured to dissipate heat from air-conditioner refrigerant, and the intake duct may be placed on the upper side relative to the air conditioner condenser.

The air-intake shutter mechanism may include a frame body, and a plurality of fins extending along each other and supported rotatably by the frame body so as to open and close an opening of the frame body, and the plurality of fins may be made of metal.

The air-cooled fuel-cell vehicle may include a front hood configured to open and close a top face of the storage chamber; and an opening degree detector configured to detect opening and closing of the front hood, and the controlling portion may be configured to control the air-exhaust shutter mechanism to the closed side when it is detected that the front hood is opened.

The intake duct and the fuel cell may be placed on the upper side relative to the motor and the transaxle.

A second aspect of the present disclosure relates to an air-cooled fuel-cell vehicle comprising: a drive motor for the vehicle; an air-cooled fuel cell configured to supply electric power to the motor; an intake duct placed on a vehicle front side relative to the fuel cell and configured to guide air to the fuel cell; an air-intake shutter mechanism configured to open and close the intake duct; a storage chamber provided on the vehicle front side relative to a passenger compartment of the vehicle and configured to accommodate the fuel cell, the intake duct, and the air-intake shutter mechanism; an electronic control unit programmed to control the air-intake shutter mechanism; and a collision detector configured to detect a front collision of the vehicle. The electronic control unit is programmed to control the air-intake shutter mechanism to a closed side when the front collision of the vehicle is detected. The intake duct includes a tubular metal plate portion or a resin portion containing an elastomer component.

According to the present disclosure, it is possible to provide an air-cooled fuel-cell vehicle that restrains damage to a fuel cell at the time of a front collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
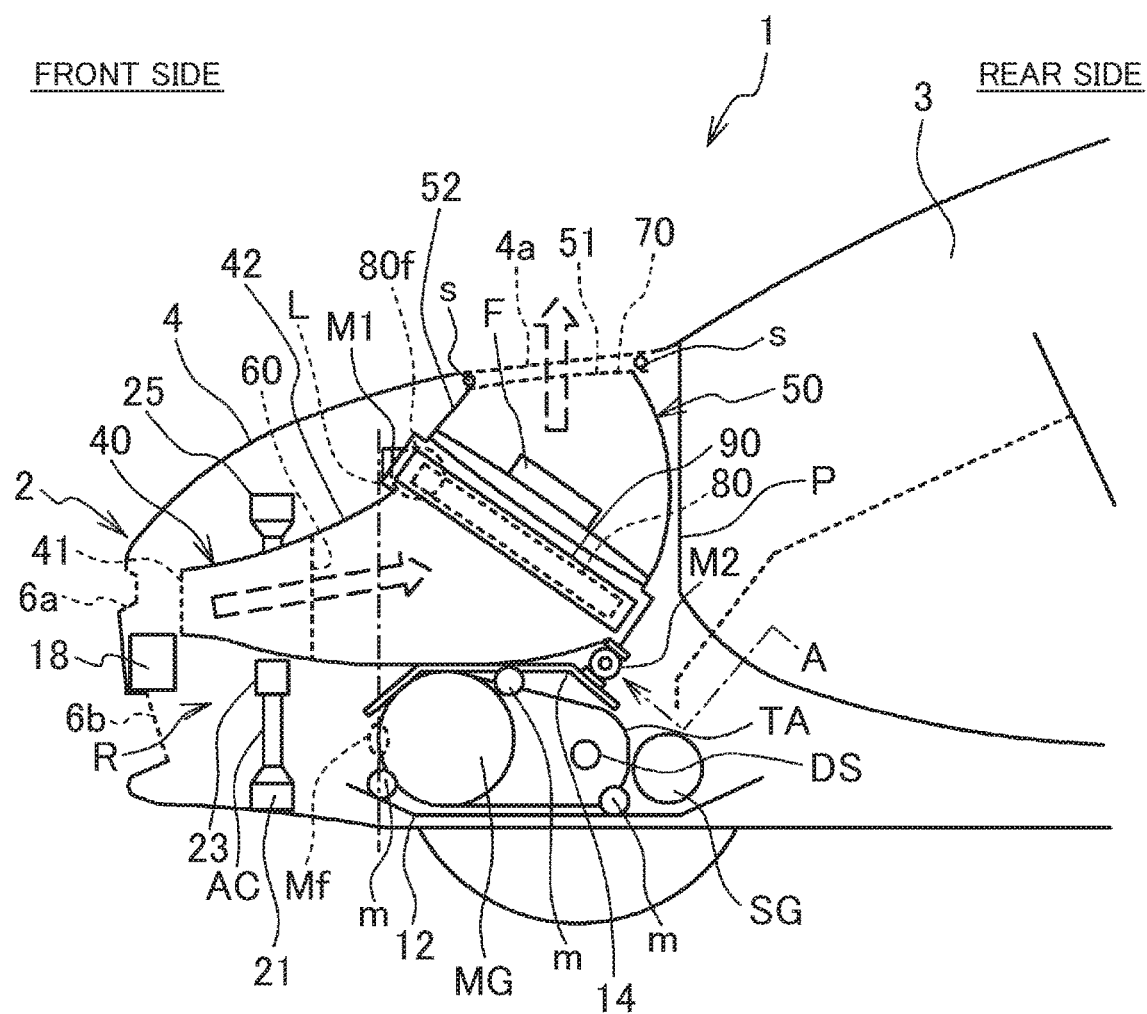
FIG. 1 is a schematic diagram of an internal structure of a vehicle on a front side.
Figure 2:
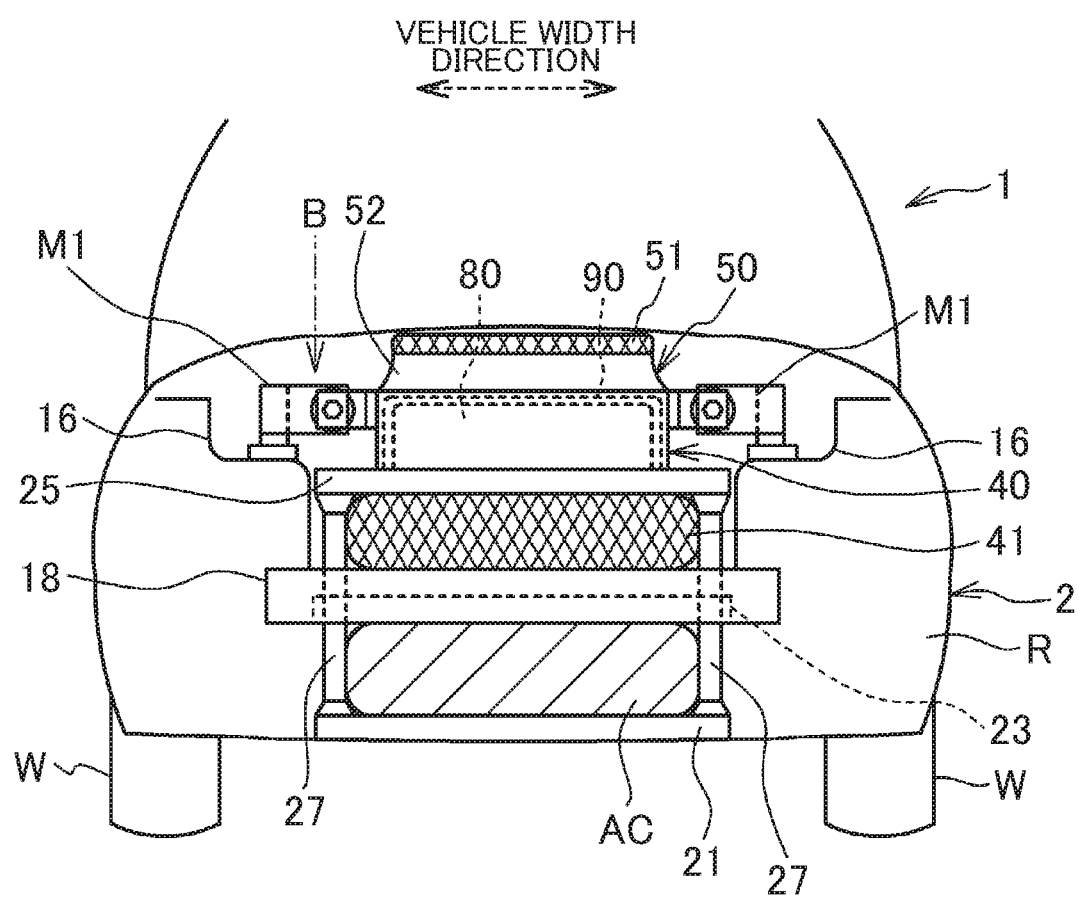
FIG. 2 is a schematic diagram of the internal structure of the vehicle on the front side.

An air-cooled fuel-cell vehicle 1 (hereinafter referred to as the vehicle) of the present embodiment will be described. FIG. 1 is a schematic diagram of an internal structure of the vehicle 1 on its front side when viewed from a side face. FIG. 2 is a schematic diagram of the internal structure of the vehicle 1 on the front side when viewed from a front face. Note that, in the present specification, "front side" and "rear side" indicate a front side and a rear side in a front-rear direction perpendicular to a vehicle width direction of the vehicle 1.

A storage chamber R is provided inside a body 2 of the vehicle 1 so as to be placed on the front side relative to a dash panel P that defines a passenger compartment 3. Further, a front hood 4 that opens and closes a top face of the storage chamber R is provided on the front side of the body 2. A motor MG, a transaxle TA, an air-cooled fuel cell stack (hereinafter referred to as the fuel cell) 80, a holding member 90, an intake duct 40, an exhaust duct 50, an air-intake shutter mechanism 60, and an air-exhaust shutter mechanism 70 are accommodated in the storage chamber R. Note that the vehicle 1 is configured such that a tank that stores hydrogen supplied to the fuel cell 80, a secondary battery configured to supply electric power to the motor MG, and the like are housed in a space other than the storage chamber R. The holding member 90 is attached to the fuel cell 80. The holding member 90 will be described later more specifically.

The motor MG is a drive motor of the vehicle 1 and is driven by electric power supplied from the fuel cell 80. The motor MG is a three-phase alternating current type, but is not limited to this. The transaxle TA is formed integrally with the motor MG and is configured to transmit power of the motor MG to a drive shaft DS extending in a vehicle width direction, so as to drive front-side wheels W connected to the drive shaft DS. The transaxle TA is a power transmission mechanism including a deceleration mechanism and a differential mechanism. The motor MG and the transaxle TA are placed side by side in the vehicle width direction. A front end portion Mf, which is an end portion of the motor MG on the front side, is placed on the front side relative to an end portion of the transaxle TA on the front side and is also placed on the front side relative to a front end portion 80f, which is an end portion of the fuel cell 80 on the front side, which will be described later more specifically. Note that the motor MG and the transaxle TA may be placed inside the storage chamber R such that the drive shaft DS extends toward a rear side of the vehicle 1, so that rear wheels are driven by the drive shaft DS.

The motor MG and the transaxle TA are supported via a mount mechanism m between a front suspension member (hereinafter referred to as the suspension member) 12 and a front cross member (hereinafter referred to as the cross member) 14. The suspension member 12 is suspended from a pair of front side members (not shown) via an insulator (not shown), so as to support the motor MG, the transaxle TA, and a steering gear SG from a lower side. The pair of front side members is provided on right and left sides in the vehicle width direction in a lower part of the storage chamber R.

The cross member 14 extends in the vehicle width direction so as to connect the pair of front side members, and is placed on an upper side relative to the motor MG and the transaxle TA, but on a lower side relative to the intake duct 40. The suspension member 12, the cross member 14, and the front side members (not shown) are examples of vehicle frame members constituting a framework of the vehicle 1.

The fuel cell 80 is a solid polymer fuel cell configured to generate electric power upon receipt of hydrogen and oxygen as reactant gases and is an air-cooled fuel cell to be cooled down not by liquid but by the air.

The intake duct 40 is placed on the front side relative to the fuel cell 80. The intake duct 40 is constituted by a tubular metal plate portion 42. The metal plate portion 42 is a molded stainless steel plate, for example, but may be a metal plate other than stainless steel, e.g., an aluminum plate, an iron plate, or a titanium plate. The metal plate portion 42 may be formed into a cylindrical shape by casting, formed into a cylindrical shape by plastic working of a single metal plate, or formed into a cylindrical shape by welding a plurality of metal plates. The intake duct 40 has an intake port 41 placed on the front side, and extends rearward from the intake port 41 toward the fuel cell 80. Further, the body 2 has a ventilating hole 6a formed at a position opposed to the intake port 41, on the upper side relative to a front bumper reinforcement 18. The intake duct 40 guides, to the fuel cell 80, the air flowing into the storage chamber R from the outside via the ventilating hole 6a.

A wire gauze that restrains entry of a foreign matter from the outside is provided in the intake port 41. Further, the intake port 41 is placed on the upper side relative to the front bumper reinforcement 18. This accordingly restrains water and stone from entering the intake duct 40 from a road surface during travel of the vehicle 1 and damaging the fuel cell 80.

The exhaust duct 50 is placed on the rear side relative to the fuel cell 80. The exhaust duct 50 is constituted by a tubular metal plate portion 52. The metal plate portion 52 is a molded stainless steel plate, but may be a metal plate other than stainless steel, e.g., an aluminum plate, an iron plate, or a titanium plate. The metal plate portion 52 may be formed into a cylindrical shape by casting, formed into a cylindrical shape by plastic working of a single metal plate, or formed into a cylindrical shape by welding a plurality of metal plates. The exhaust duct 50 extends upward from the fuel cell 80 and has an exhaust port 51 at a position opposed to the front hood 4. Further, the front hood 4 has a ventilating hole 4a formed at a position opposed to the exhaust port 51. The exhaust duct 50 discharges the air passing through the fuel cell 80 to the outside of the storage chamber R on the upper side relative to the fuel cell 80, via the exhaust port 51 and the ventilating hole 4a.

A wire gauze that restrains entry of a foreign matter from the outside is also provided in the exhaust port 51. This accordingly restrains a relatively large foreign matter from entering the exhaust duct 50 and damaging the fuel cell 80.

Note that a sealing member s is provided on an inner side of the front hood 4 so as to prevent leakage of the air from gaps around the ventilating hole 4a and around the exhaust port 51. The sealing member s is made of rubber or sponge, for example.

A fan F that promotes a flow of the air passing through the fuel cell 80 is placed inside the exhaust duct 50. The fan F is placed on a downstream side relative to the fuel cell 80, so as to suck up the intake air from an intake-duct-40 side and discharge the air to an exhaust-duct-50 side. When the air passes through the fuel cell 80 as such, oxygen to be subjected to power generation is supplied to the fuel cell 80 and the fuel cell 80 is cooled off.

In FIG. 1, a direction of the air directed to the fuel cell 80 in the intake duct 40 and a direction of the air discharged from the exhaust duct 50 are indicated by arrows. The air that passes through the fuel cell 80 flows generally in a circular arc shape by the intake duct 40 and the exhaust duct 50, when viewed from a side face of the vehicle 1. This reduces a pressure loss of the air, so that a sufficient amount of the air can be supplied to the fuel cell 80.

The air-intake shutter mechanism 60 and the air-exhaust shutter mechanism 70 open and close the intake duct 40 and the exhaust duct 50, respectively. During travel of the vehicle 1, the air-intake shutter mechanism 60 and the air-exhaust shutter mechanism 70 are maintained in an opened state in principle. Details will be described later.

In the storage chamber R, an air conditioner condenser AC is accommodated below the intake duct 40. The body 2 has a ventilating hole 6b formed on the lower side relative to the front bumper reinforcement 18 and on the front side relative to the air conditioner condenser AC. The air conditioner condenser AC dissipates heat from refrigerant for an air conditioner by heat-exchanging between the refrigerant for the air conditioner and the air flowing inside the storage chamber R through the ventilating hole 6b.

The air conditioner condenser AC is placed on the lower side relative to the intake duct 40. More specifically, a support lower member 21 supports a lower side of the air conditioner condenser AC, a support member 23 supports an upper side of the air conditioner condenser AC and a lower side of the intake duct 40, and a support upper member 25 supports an upper side of the intake duct 40. Further, the support member 23 and the support upper member 25 are supported by a columnar member 27, illustrated in FIG. 2, fixed to the support lower member 21.

The fuel cell 80 is fixed to a vehicle frame member by mount mechanisms M1 and M2. More specifically, as illustrated in FIG. 2, the mount mechanism M1 fixes the holding member 90 that holds the fuel cell 80 to right and left apron upper members 16. The right and left apron upper members 16 extend in the vehicle front-rear direction on the upper side relative to the right and left side members and outside the right and left side members in the vehicle width direction and they are an example of the vehicle frame member.

As illustrated in FIG. 1, the mount mechanism M2 is fixed to a rear side of the cross member 14 and is placed on the lower side and on the rear side relative to the mount mechanism M1. Accordingly, the mount mechanism M1 is an example of an upper mount mechanism that fixes the fuel cell 80 to the vehicle frame member, and the mount mechanism M2 is an example of a lower mount mechanism that fixes the fuel cell 80 to the vehicle frame member below the mount mechanism M1. Note that two mount mechanisms M2 are provided, but one mount mechanism M2 may be provided. Details of structures of the mount mechanisms M1 and M2 will be described later.

The fuel cell 80 is held in a posture inclined by the mount mechanisms M1 and M2 so that its upper part is placed on the front side relative to its lower part in a limited space on the upper side relative to the motor MG and the transaxle TA. For example, in a case where the fuel cell 80 is held in a vertical posture on the upper side relative to the motor MG and the transaxle TA, a large-sized fuel cell 80 may not be employed due to the limitation in the height of the storage chamber R. Further, in a case where the fuel cell 80 is held in a horizontal posture on the upper side relative to the motor MG and the transaxle TA, the flow of the air passing through the fuel cell 80 is complicated, which increases the pressure loss of the air, so that a sufficient amount of the air may not be supplied to the fuel cell 80. Accordingly, by holding the fuel cell 80 with the inclined posture like the present embodiment, it is possible to employ a large-sized fuel cell 80 in the limited space on the upper side relative to the motor MG and the transaxle TA and to secure an amount of the air to be supplied to the fuel cell 80.

Further, in a case where the fuel cell 80 is placed on a passage of the air that flows from the front side of the storage chamber R to the upper side thereof, when the fuel cell 80 is placed diagonally, it is possible to equally flow the air through each cell in the fuel cell 80.

Figure 3A:
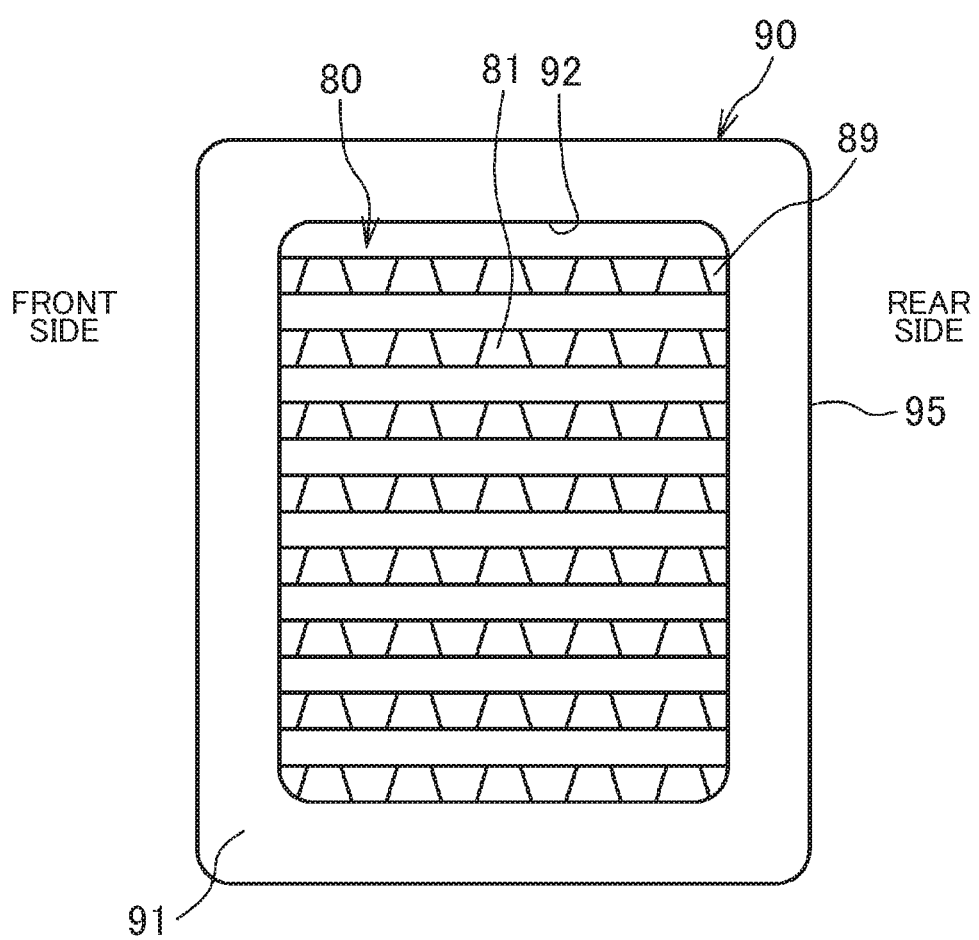
FIG. 3A is an explanatory view of a fuel cell and a holding member.
Figure 3B:
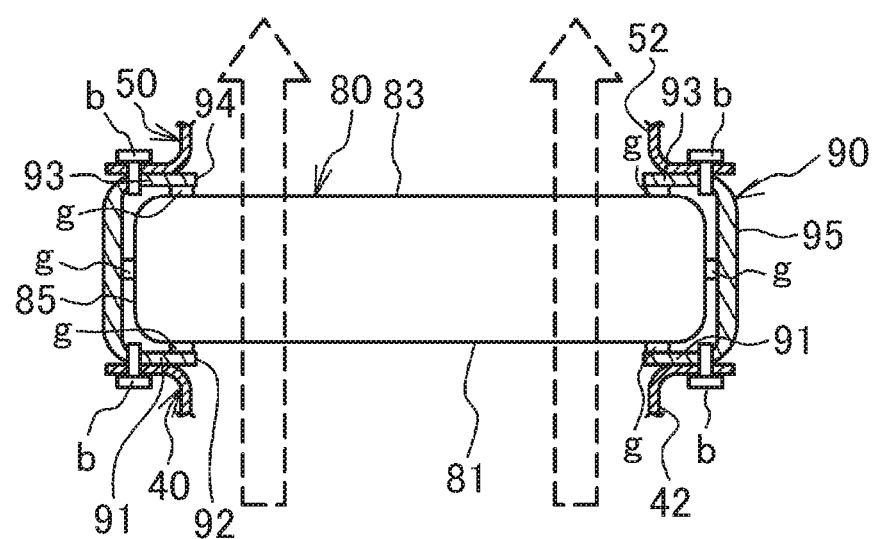
FIG. 3B is an explanatory view of the fuel cell and the holding member.

Next will be described shapes of the fuel cell 80 and the holding member 90. FIGS. 3A and 3B are explanatory views of the fuel cell 80 and the holding member 90. FIG. 3A is a view of the fuel cell 80 and the holding member 90 when viewed from the lower side. FIG. 3B is a partial sectional view of FIG. 3A, and an internal structure of the fuel cell 80 is not illustrated.

The fuel cell 80 has a bottom face 81 on a side into which the air flows, a top face 83 on a side from which the air is discharged, and an outer peripheral surface 85, which is a surface except for the bottom face 81 and the top face 83. The fuel cell 80 has a generally rectangular shape when viewed from a bottom-face-81 side or a top-face-83 side. Each of a plurality of laminated cells constituting the fuel cell 80 has a plurality of cathode passages 89 that allows the air to pass in a direction perpendicular to a laminating direction. In the present embodiment, the plurality of cells of the fuel cell 80 is laminated generally in the vehicle width direction and is placed so that a longitudinal direction of the fuel cell 80 is generally along the vehicle width direction of the vehicle 1, but is not limited to this.

The holding member 90 is made of metal and has a generally frame shape covering the outer peripheral surface 85 of the fuel cell 80 and outer peripheral edges of the bottom face 81 and the top face 83 thereof. More specifically, the holding member 90 includes a peripheral wall portion 95, a lower peripheral portion 91, and an upper peripheral portion 93. The peripheral wall portion 95 is opposed to the outer peripheral surface 85 of the fuel cell 80, and has a generally rectangular shape when viewed from the bottom-face-81 side or the top-face-83 side of the fuel cell 80. The lower peripheral portion 91 is bent inward from the peripheral wall portion 95 so as to be generally in parallel with the bottom face 81 of the fuel cell 80. The upper peripheral portion 93 is bent inward from the peripheral wall portion 95 so as to be generally in parallel with the top face 83 of the fuel cell 80. The lower peripheral portion 91 and the upper peripheral portion 93 have a generally frame shape when viewed from the bottom-face-81 side and the top-face-83 side of the fuel cell 80, respectively, and define openings 92 and 94 that allow the air to pass through the fuel cell 80. In FIG. 3B, directions of the air passing through the fuel cell 80 via the openings 92 and 94 are indicated by arrows.

A plurality of buffer members g made of rubber is placed between an inner surface of the holding member 90 and an outer surface of the fuel cell 80. Thus, the fuel cell 80 is held by the holding member 90.

The lower peripheral portion 91 of the holding member 90 is fixed to an end portion of the intake duct 40 by a bolt b. The upper peripheral portion 93 of the holding member 90 is fixed to an end portion of the exhaust duct 50 by a bolt b. When the holding member 90 is fixed to the intake duct 40 and the exhaust duct 50 as such, the fuel cell 80 is supported between the intake duct 40 and the exhaust duct 50.

Figure 4A:
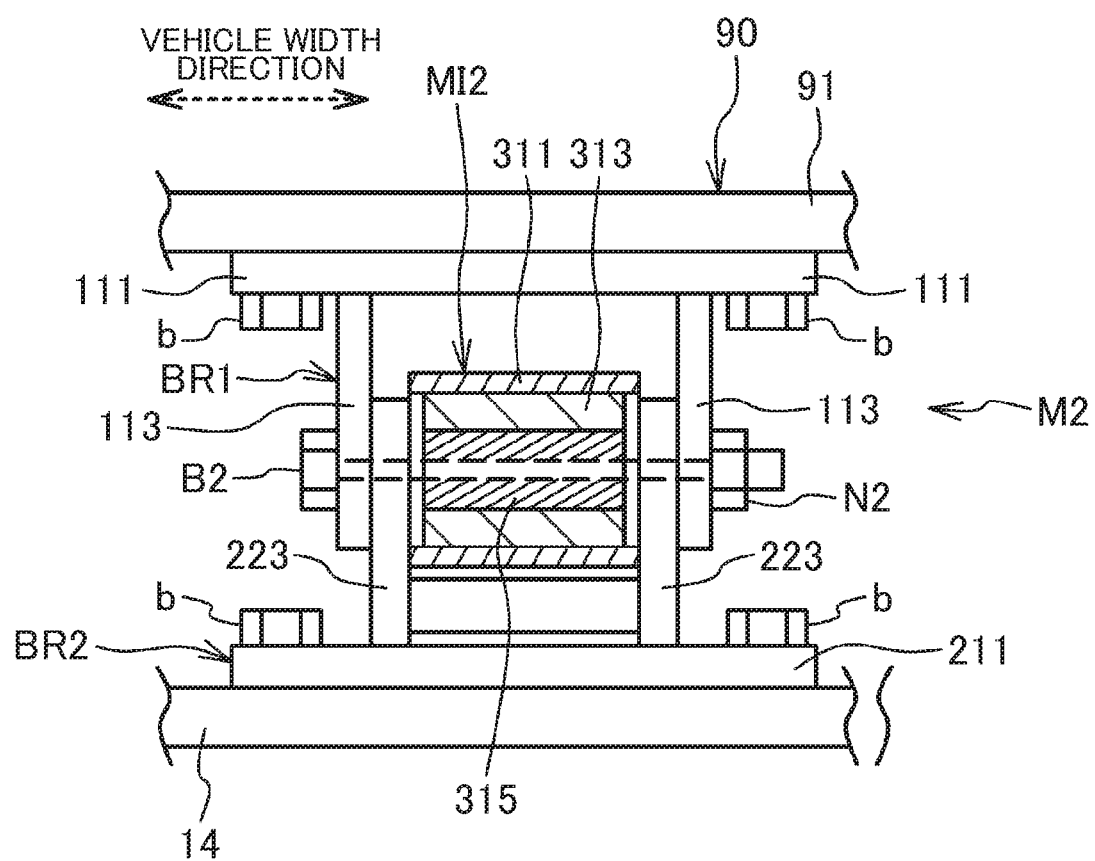
FIG. 4A is an explanatory view of a mount mechanism.

Next will be described the structures of the mount mechanisms M1 and M2. The structure of the mount mechanism M2 will be described first. FIG. 4A is an explanatory view of the mount mechanism M2, and illustrates the mount mechanism M2 when viewed from a direction of an arrow A in FIG. 1. The mount mechanism M2 includes a bracket BR1 fixed to a fuel-cell side member, a bracket BR2 fixed to the vehicle frame-member, and an insulator MI2 held by the bracket BR2. More specifically, the bracket BR1 is fixed, by a bolt b, to the lower peripheral portion 91 of the holding member 90 that holds the fuel cell 80. The bracket BR2 is fixed to a top side of the cross member 14 by a bolt b. Note that, in FIG. 4A, only the insulator MI2 is illustrated in a section.

The bracket BR1 includes a base portion 111 fixed to the lower peripheral portion 91 of the holding member 90, and two support pieces 113 extending generally in parallel with each other generally perpendicularly from the base portion 111 and placed side by side generally in the vehicle width direction. The bracket BR2 includes a base portion 211 fixed to the cross member 14, and two support pieces 223 extending generally in parallel with each other generally perpendicularly from the base portion 211 and placed side by side generally in the vehicle width direction. The two support pieces 223 are placed between the two support pieces 113 of the bracket BR1. The insulator MI2 is held in a sandwiched manner between the two support pieces 223.

The insulator MI2 includes an outer cylinder 311 and an inner cylinder 315 made of metal and placed concentrically to each other, and a tubular elastic body 313 made of rubber and placed between the outer cylinder 311 and the inner cylinder 315. The outer cylinder 311 is fixed to the two support pieces 223, but the elastic body 313 and the inner cylinder 315 are not fixed to the support pieces 223, so that they are movable with respect to the support pieces 223.

Further, the brackets BR1 and BR2 are fastened by a fastening bolt B2 and a nut N2. More specifically, the fastening bolt B2 penetrates through holes formed in the support pieces 113 and 223, and in a state where the fastening bolt B2 is inserted into the inner cylinder 315, a tip end side thereof is fastened to the nut N2.

Here, a diameter of the hole of the support piece 113 through which a shaft portion of the fastening bolt B2 penetrates is generally the same as that of a shaft portion of the fastening bolt B2. On the other hand, a diameter of the hole of the support piece 223 through which the shaft portion of the fastening bolt B2 penetrates is formed to be larger than that of the support piece 113. Here, the support piece 223 is allowed to move relative to the fastening bolt B2 just by elastic deformation of the elastic body 313. That is, the insulator MI2 elastically supports the bracket BR2. As such, the holding member 90 is elastically supported by the mount mechanism M2, thereby restraining the vibration of the motor MG and the transaxle TA from being transmitted to the fuel cell 80, for example.

Note that the fastening bolt B2 extends generally in the vehicle width direction, and the brackets BR1 and BR2 are connected rotatably around the fastening bolt B2 to some extent.

Figure 4B:
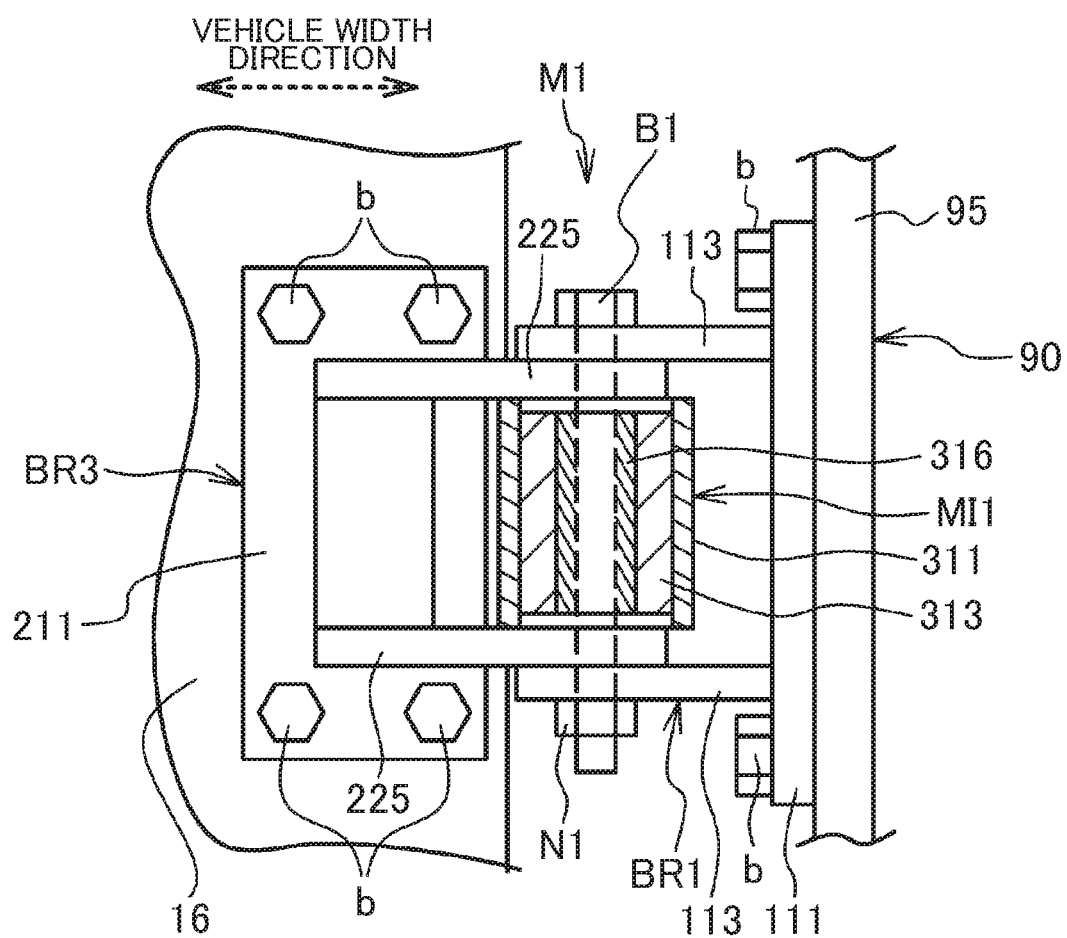
FIG. 4B is an explanatory view of the mount mechanism.

FIG. 4B illustrates the mount mechanism M1 when viewed from a direction of an arrow B in FIG. 2. The mount mechanism M1 includes a bracket BR1 fixed to the fuel-cell side member, a bracket BR3 fixed to the vehicle frame-member, and an insulator MI1 held by the bracket BR3. More specifically, the bracket BR1 of the mount mechanism M1 is fixed, by a bolt b, to the peripheral wall portion 95 of the holding member 90. The bracket BR3 is fixed to the apron upper member 16 by a bolt b. In FIG. 4B, only the insulator MI1 is illustrated in a section. The bracket BR1 is the same as the bracket BR1 of the mount mechanism M2, so a description thereof is omitted.

The bracket BR3 includes a base portion 211 fixed to the apron upper member 16, and two support pieces 225 rising generally perpendicularly from the base portion 211 so as to extend generally in parallel with each other and to be placed side by side generally in the vehicle front-rear direction. The insulator MI1 is held in a sandwiched manner between the support pieces 225.

The insulator MI1 includes an outer cylinder 311, an elastic body 313, and an inner cylinder 316. Differently from the inner cylinder 315 of the insulator MI2, the inner cylinder 316 is formed such that its inner diameter is larger than that of the inner cylinder 315. Further, the brackets BR1 and BR3 are fastened by a fastening bolt B1 and a nut N1, but an outside diameter of the fastening bolt B1 inserted into the inner cylinder 316 is formed to be larger than the outside diameter of the fastening bolt B2 of the insulator MI2. On this account, the fastening bolt B2 has strength lower than the fastening bolt B1, so the fastening bolt B2 is more vulnerable. Accordingly, the fastening bolt B2 is broken more easily than the fastening bolt B1. On this account, at the time of a front collision of the vehicle 1, for example, the mount mechanism M2 is broken more easily than the mount mechanism M1. Accordingly, the fastening bolt B2 is an example of a vulnerable portion that facilitates breakage of the mount mechanism M2 as compared with the mount mechanism M1. The reason for this configuration will be described later more specifically.

Note that the vulnerable portion is not limited to the fastening bolt B2, provided that the mount mechanism M2 is broken more easily than the mount mechanism M1. For example, a thickness of at least one of the support pieces 113 and 223 of the mount mechanism M2 may be thinner and more vulnerable than the support pieces 113 and 225 of the mount mechanism M1. Further, the bolt b used in the mount mechanism M2 may have a diameter smaller than the bolt b used in the mount mechanism M1, so as to be more vulnerable. Further, the rigidity of the material of at least one of the brackets BR1 and BR2 of the mount mechanism M2 may be lower than the rigidity of the brackets BR1 and BR3 of the mount mechanism M1, so that the at least one of the brackets BR1 and BR2 of the mount mechanism M2 is more vulnerable.

Further, in the present embodiment, the mount mechanism M1 and the mount mechanism M2 are attached to the vehicle 1 in different attachment directions as described above. More specifically, as illustrated in FIG. 5, when viewed from a vertically upper side of the vehicle 1, an axial direction of the fastening bolt B2 of the mount mechanism M2 corresponds to the vehicle width direction, whereas an axial direction of the fastening bolt B1 of the mount mechanism M1 is perpendicular to the vehicle width direction.

Figure 5:
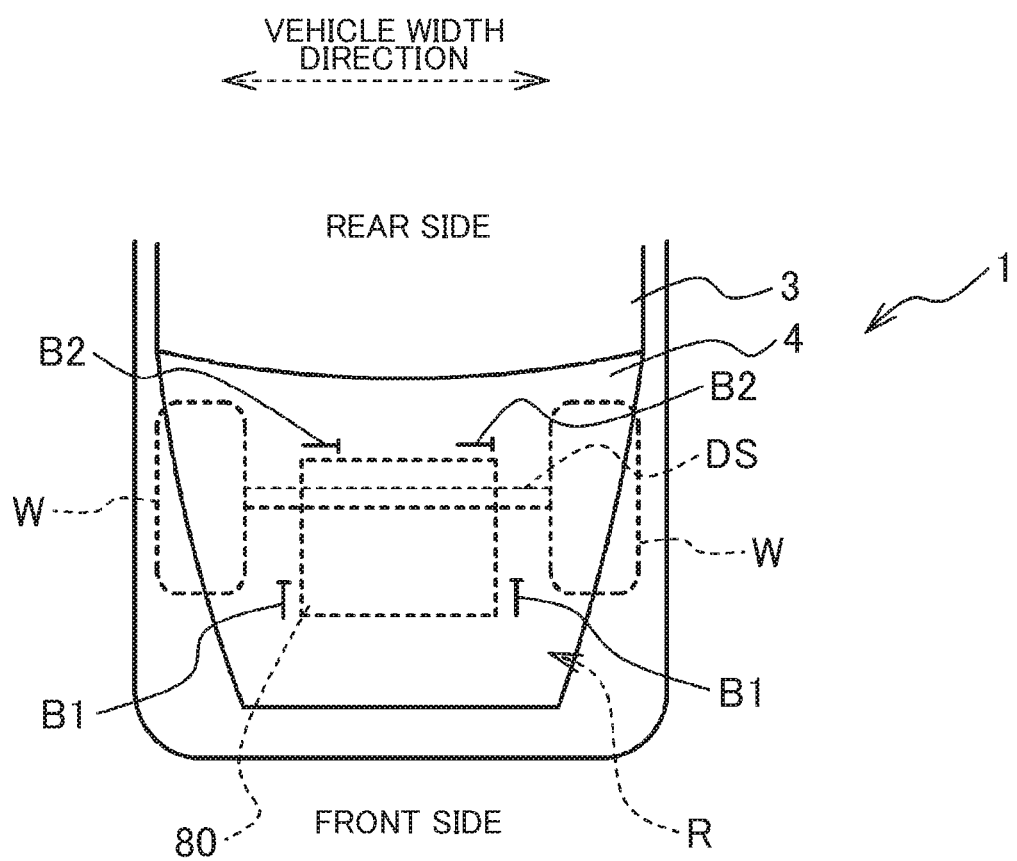
FIG. 5 is a simplified illustration illustrating orientations of fastening bolts when the vehicle is viewed from a vertically upper side.

FIG. 5 is a simplified illustration illustrating orientations of the fastening bolts B1 and B2 when the vehicle 1 is viewed from the vertically upper side. With this configuration, when the fuel cell 80 is to move rearward at the time of a front collision, a load in a compression direction is applied to the fastening bolt B1 of the mount mechanism M1, whereas a load in a shearing direction is applied to the fastening bolt B2 of the mount mechanism M2. Here, the bolt is easily broken at the time of receiving a shearing load as compared with the time of receiving a compressive load. On this account, even if the fastening bolts B1 and B2 have the same outside diameter and the structures and materials of the mount mechanisms M1 and M2 other than that are the same, the mount mechanism M2 is more easily broken.

Note that, when the vehicle 1 is viewed from a vertical direction, an angle between the axial direction of the fastening bolt B2 of the mount mechanism M2 and the vehicle width direction is 0°, and an angle between the axial direction of the fastening bolt B1 of the mount mechanism M1 and the vehicle width direction is 90°, but the angles are not limited to the above. When the vehicle 1 is viewed from the vertical direction, the axial direction of the fastening bolt B2 of the mount mechanism M2 should be more parallel to the vehicle width direction than the axial direction of the fastening bolt B1 of the mount mechanism M1.

Figure 6:
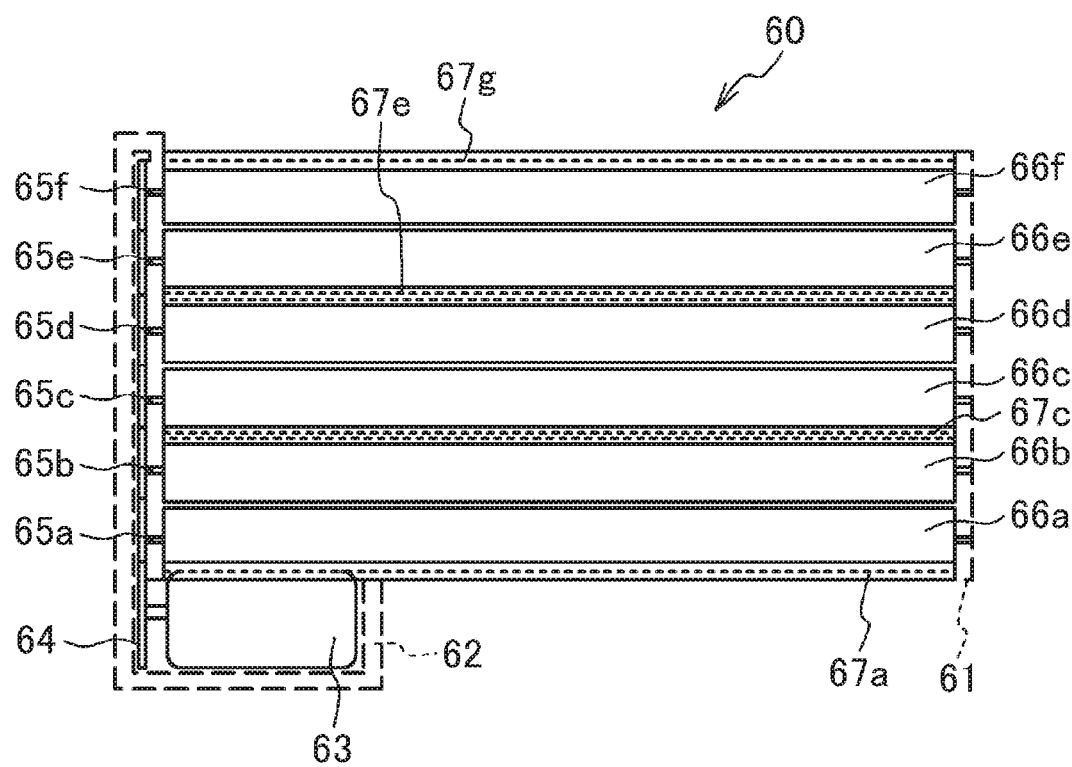
FIG. 6 is a front view of an air-intake shutter mechanism.
Figure 7A:
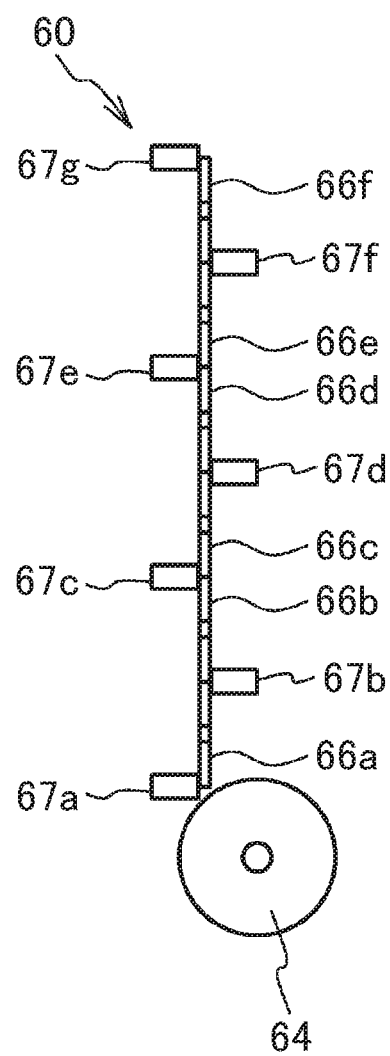
FIG. 7A is a schematic side view of the air-intake shutter mechanism.
Figure 7B:
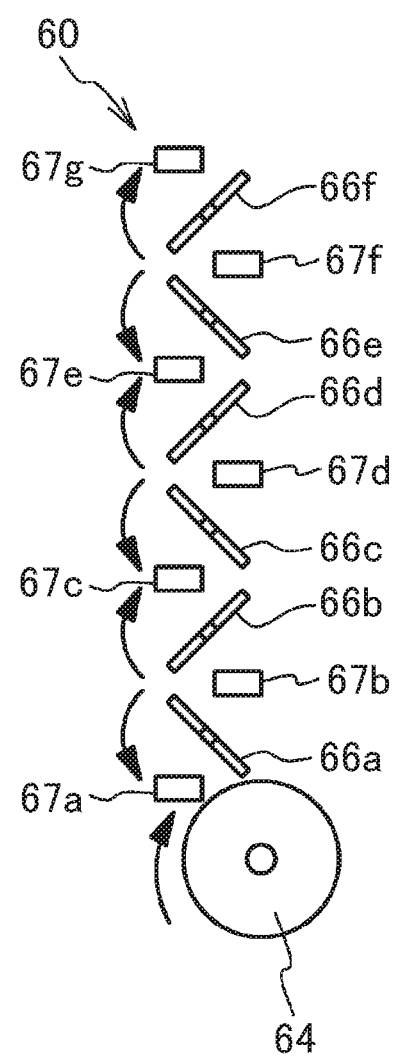
FIG. 7B is a schematic side view of the air-intake shutter mechanism.
Figure 7C:
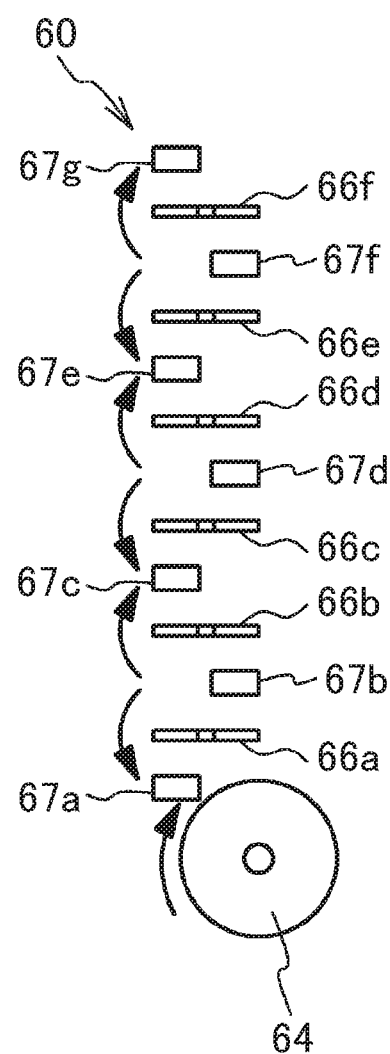
FIG. 7C is a schematic side view of the air-intake shutter mechanism.

Next will be described a structure of the air-intake shutter mechanism 60. Note that the air-exhaust shutter mechanism 70 has the same basic structure as the air-intake shutter mechanism 60, so a description of the air-exhaust shutter mechanism 70 is omitted. FIG. 6 is a front view of the air-intake shutter mechanism 60. FIGS. 7A to 7C are schematic side views of the air-intake shutter mechanism 60. FIGS. 6 and 7A illustrate a fully closed state, FIG. 7B illustrates a half-opened state, and FIG. 7C illustrates a fully opened state.

The air-intake shutter mechanism 60 includes a frame body 61, a housing 62, a motor 63, a drive gear 64, driven gears 65a to 65f, fins 66a to 66f, and sealing members 67a to 67g. The frame body 61, the housing 62, the driven gears 65a to 65f, and the fins 66a to 66f are made of metal. The sealing members 67a to 67g are made of rubber.

The frame body 61 rotatably supports the plurality of fins 66a to 66f, and further supports the sealing members 67a to 67g. The fins 66a to 66f and the sealing members 67a to 67g extend generally in the same direction and are placed generally in parallel with each other. The housing 62 accommodates therein the motor 63, the drive gear 64, and the driven gears 65a to 65f outside the frame body 61.

The frame body 61 is inserted into a slit formed in the intake duct 40, so that the fins 66a to 66f are placed inside the intake duct 40. In the meantime, the housing 62 is placed outside the intake duct 40. The motor 63 is controlled by the after-mentioned control device (ECU) 100 so as to rotate the fins 66a to 66f. The drive gear 64 is connected to an output shaft of the motor 63. Further, the motor 63 is a stepping motor, for example, and its rotation stop position is controlled by the control device (ECU) 100. Hereby, as illustrated in FIGS. 7A to 7C, stop positions of the fins 66a to 66f can be also controlled, so that the air-intake shutter mechanism 60 can be maintained at a desired opening degree.

The driven gears 65a to 65f are connected to rotating shafts of the fins 66a to 66f. Here, the drive gear 64 meshes with the driven gear 65a, the driven gear 65a meshes with the driven gear 65b, the driven gear 65b meshes with the driven gear 65c, the driven gear 65c meshes with the driven gear 65d, the driven gear 65d meshes with the driven gear 65e, and the driven gear 65e meshes with the driven gear 65f Hereby, a rotational power of the motor 63 is transmitted from the drive gear 64 to the driven gears 65a to 65e, so that two adjacent driven gears among the driven gears 65a to 65e rotate in directions reverse to each other. Accordingly, two adjacent fins among the fins 66a to 66f also rotate in directions reverse to each other.

In the fully closed state, the sealing members 67a to 67g close gaps between the fins 66a to 66f and restrict rotational ranges of the fins 66a to 66f. In the fully closed state, the sealing members 67b to 67f, respectively, close a gap between the fin 66a and the fin 66b, a gap between the fin 66b and the fin 66c, a gap between the fin 66c and the fin 66d, a gap between the fin 66d and the fin 66e, and a gap between the fin 66e and the fin 66f. Further, the sealing member 67a closes a gap between the fin 66a and an inner edge of the frame body 61 in the fully closed state, and the sealing member 67g closes a gap between the fin 66f and the inner edge of the frame body 61 in the fully closed state. Further, in consideration of respective rotation directions of the fins 66a to 66f, the sealing members 67a, 67c, 67e, and 67g are placed on the front side relative to the fins 66a to 66f, and the sealing members 67b, 67d, and 67f are placed on the rear side relative to the fins 66a to 66f.

Figure 8:
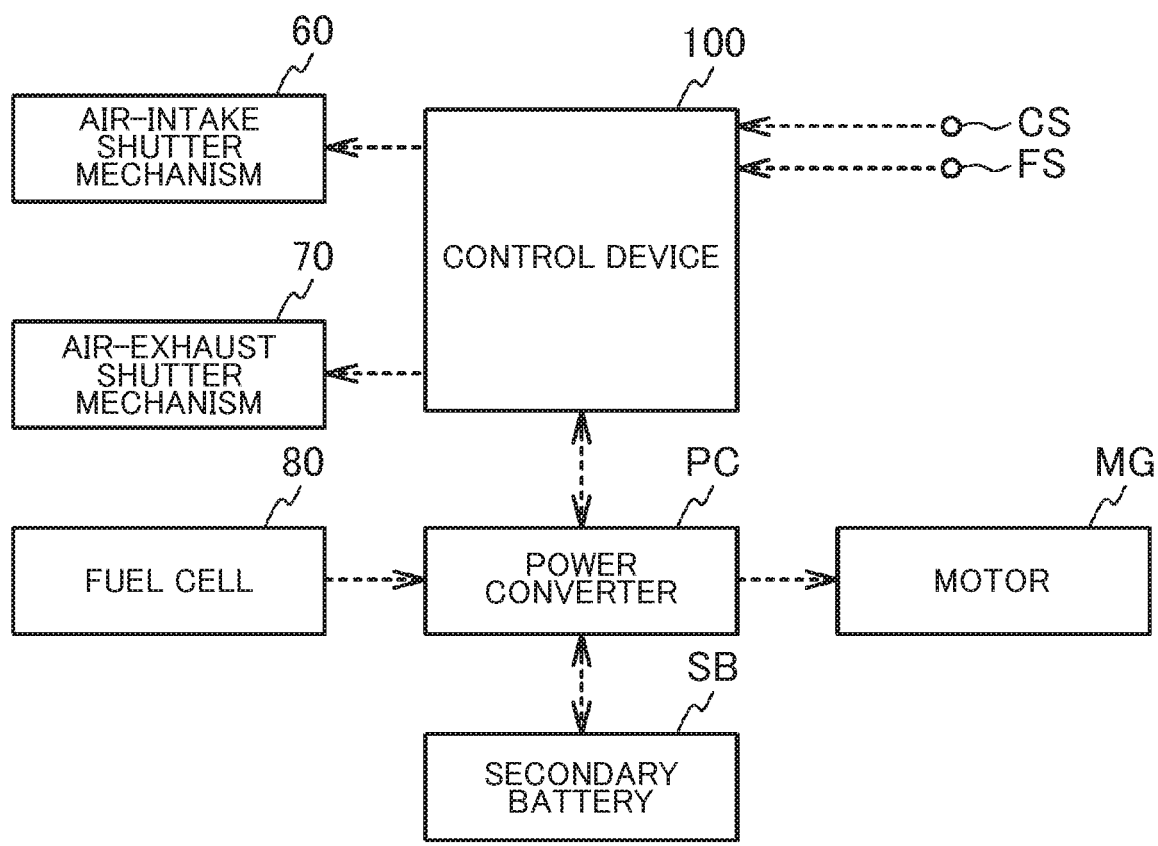
FIG. 8 is a system configuration diagram of the vehicle.

Next will be described a control system of the vehicle 1 briefly. FIG. 8 is a system configuration diagram of the vehicle 1. The control device 100 is a computer including a CPU, a ROM, a RAM, and the like, and controls driving of the motor MG by controlling a power converter PC upon receiving an input from an accelerator opening sensor. The power converter PC includes a fuel cell converter that boosts electric power supplied from the fuel cell 80, a secondary battery converter that boosts electric power supplied from the secondary battery SB, and an inverter that converts the electric power thus boosted from a direct current to an alternating current and supplies the alternating current to the motor MG or other accessories. The power converter PC and the secondary battery SB are placed on the lower side relative to the floor panel of the vehicle 1, for example.

A hood switch FS is an example of an opening degree detector that detects opening and closing of the front hood 4. The hood switch FS is a switch placed in the vicinity of the front hood 4 in the storage chamber R and configured to switch an output signal between an ON signal and an OFF signal according to opening/closing of the front hood 4. The output signal of the hood switch FS is input into the control device 100.

A collision sensor CS is an example of a collision detector that detects a front collision of the vehicle 1 by detecting impact applied to the vehicle 1. More specifically, the collision sensor CS is an air bag sensor and is used mainly to operate an air bag at the time when the vehicle 1 has a collision.

Note that the collision sensor CS is not limited to the air bag sensor, and may be a pre-crash sensor, for example. The pre-crash sensor is a sensor that detects that the vehicle 1 highly probably collides with an object on the front side. The probability of the collision of the vehicle 1 is determined generally based on information from a camera provided in the vehicle 1, a radar that measures an inter-vehicle distance, and the like, and information of a travel state such as a vehicle speed.

Figure 9:
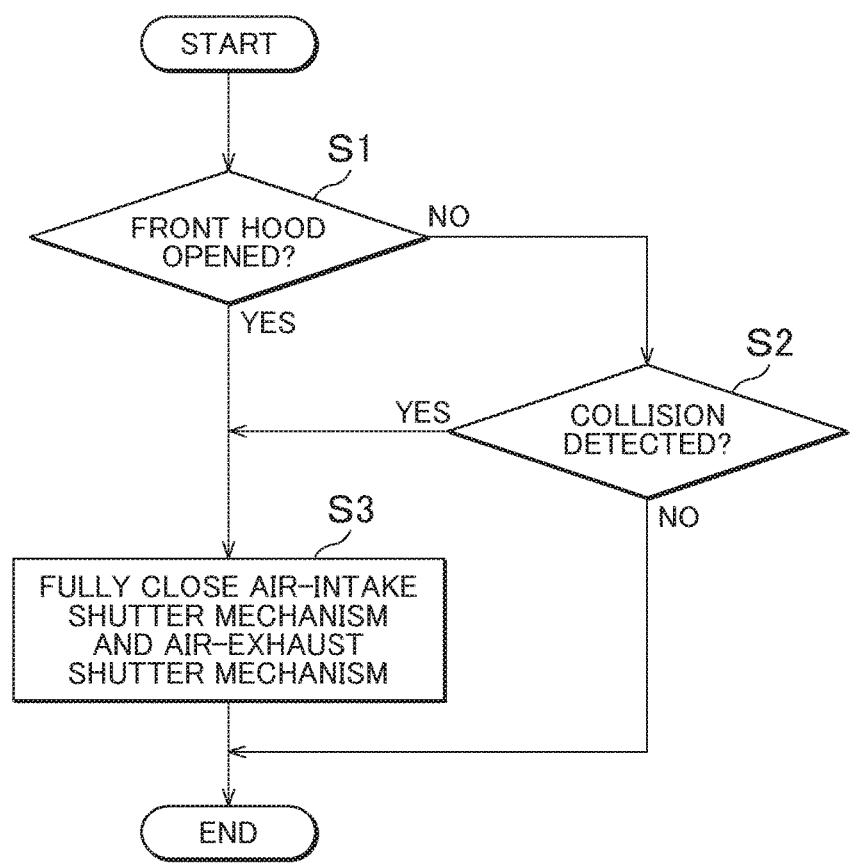
FIG. 9 is a flowchart illustrating an example of a fully-closing control executed by a control device with respect to the air-intake shutter mechanism and an air-exhaust shutter mechanism.

The control device 100 controls opening degrees of the air-intake shutter mechanism 60 and the air-exhaust shutter mechanism 70, according to a requested power generation amount to the fuel cell 80, a travel speed of the vehicle 1, and the like. However, the control device 100 fully closes the air-intake shutter mechanism 60 and the air-exhaust shutter mechanism 70 based on output signals from the collision sensor CS and the hood switch FS. The control device 100 is an example of a controlling portion that controls the air-intake shutter mechanism 60 and the air-exhaust shutter mechanism 70. The following described a fully-closing control executed by the control device 100 with respect to the air-intake shutter mechanism 60 and the air-exhaust shutter mechanism 70. FIG. 9 is a flowchart illustrating an example of the fully-closing control executed by the control device 100 with respect to the air-intake shutter mechanism 60 and the air-exhaust shutter mechanism 70. The control is repeatedly executed every predetermined period.

The control device 100 determines whether the front hood 4 is opened or not, based on an output signal from the hood switch FS (step S1). In a case of a negative determination, the control device 100 determines whether the vehicle 1 has a collision or not, based on an output signal from the collision sensor CS (step S2). In a case of a negative determination in both steps S1 and S2, this control is finished.

In a case of an affirmative determination in step S1, that is, in a case where the front hood 4 is opened, the control device 100 fully closes the air-intake shutter mechanism 60 and the air-exhaust shutter mechanism 70. Hereby, when the front hood 4 is opened, it is possible to restrain water, dust, or the like from entering the exhaust duct 50 and damaging the fuel cell 80. Note that, when it is detected that the front hood 4 is opened, only the air-exhaust shutter mechanism 70 may be fully closed with the air-intake shutter mechanism 60 being kept opened. This is because, even in this case, it is still possible to restrain the entry of water and dust into the exhaust duct 50.

Figure 10:
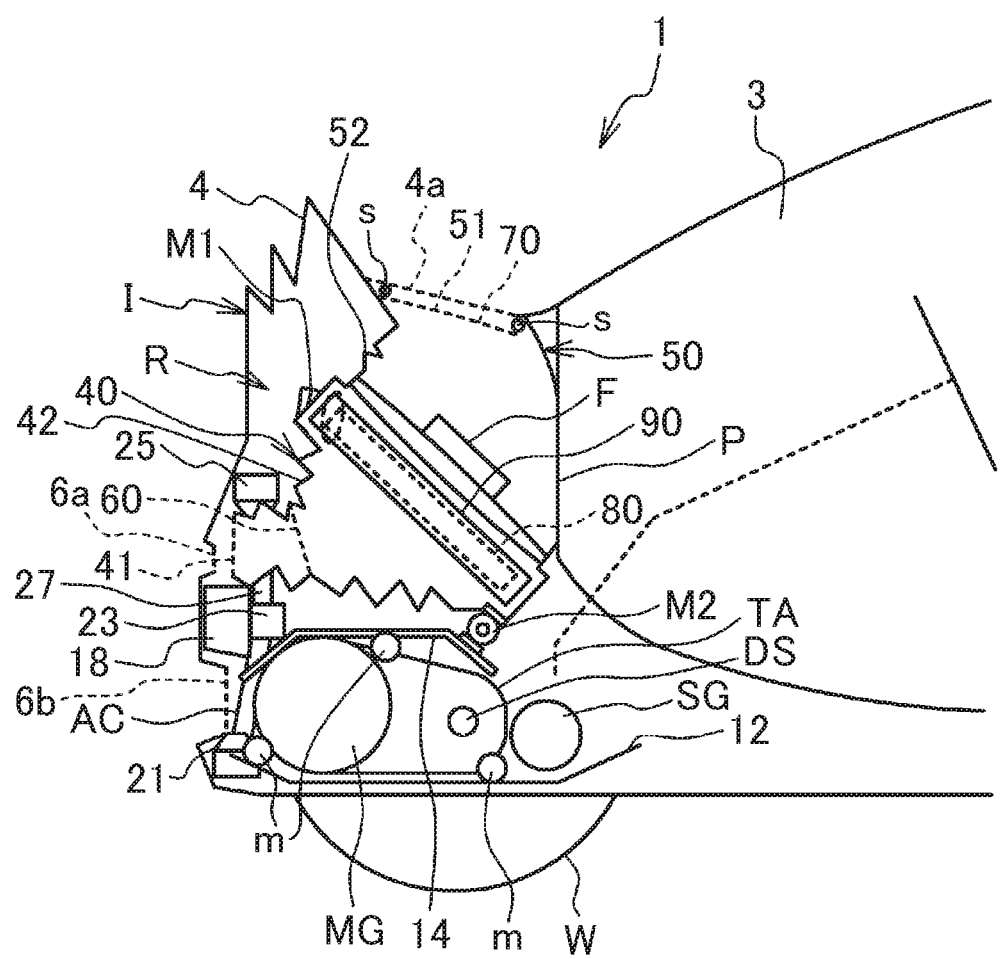
FIG. 10 is a schematic diagram of the internal structure of the vehicle on the front side at the time of a front collision.

In a case of an affirmative determination in step S2, that is, in a case where the vehicle 1 has a collision, the control device 100 fully closes the air-intake shutter mechanism 60 and the air-exhaust shutter mechanism 70. FIG. 10 is a schematic view of an internal structure of the vehicle 1 on the front side at the time of a front collision. Due to the front collision, the intake duct 40 and the exhaust duct 50 are deformed, but the air-intake shutter mechanism 60 and the air-exhaust shutter mechanism 70 are fully closed at the time of the collision, as described above. Hereby, when the vehicle 1 has a front collision, for example, it is possible to restrain such a situation that the fuel cell 80 is damaged such that a foreign matter from the outside or a component on the vehicle-1 side enters the intake duct 40 or the exhaust duct 50 and collides with the fuel cell 80. Further, it is also possible to restrain water and the like from entering the intake duct 40 or the exhaust duct 50 from the outside after the collision and damaging the fuel cell 80.

Note that the collision sensor CS detects not only the front collision but also other collisions, and even in a case where a collision other than the front collision is detected, the control device 100 fully closes both of the air-intake shutter mechanism 60 and the air-exhaust shutter mechanism 70. However, the collision sensor CS may be able to detect at least whether the vehicle 1 has a front collision or not.

Note that the control is not limited to controlling the air-intake shutter mechanism 60 and the air-exhaust shutter mechanism 70 to be fully closed. For example, in a case where an affirmative determination is made in step S1 or S2, they may not be controlled to be fully closed, provided that the air-intake shutter mechanism 60 and the air-exhaust shutter mechanism 70 are controlled to a closed side so that their respective opening degrees are smaller than respective opening degrees of the air-intake shutter mechanism 60 and the air-exhaust shutter mechanism 70 just before the determination. This is because, even in this case, it is still possible to restrain the entry of a foreign matter into the intake duct 40 and the exhaust duct 50.

Further, the fins 66a to 66f of the air-intake shutter mechanism 60 are made of metal as described above, and therefore, even if they are deformed due to a front collision, the intake duct 40 can be easily maintained in the fully closed state. This can apply to the air-exhaust shutter mechanism 70. Accordingly, it is possible to restrain the entry of a foreign matter into the intake duct 40 and the exhaust duct 50.

Further, as described above, the intake duct 40 and the exhaust duct 50 are generally constituted by the metal plate portions 42 and 52 made of tubular metal plates. Accordingly, as illustrated in FIG. 10, at the time of a front collision, the intake duct 40 and the exhaust duct 50 are deformed, but their breakage or crush is restrained. This restrains a component and a foreign matter from colliding with the fuel cell 80. Further, when the intake duct 40 is deformed at the time of a front collision, part of a collision load is used for the deformation of the intake duct 40, and impact transmitted to the fuel cell 80 is relaxed. This also restrains the damage to the fuel cell 80.

Further, in FIG. 1, a vertical line L passing through the front end portion Mf of the motor MG is illustrated, but the vertical line L is placed on the front side relative to the front end portion 80f of the fuel cell 80. That is, the front end portion Mf of the motor MG is placed on the front side relative to the front end portion 80f of the fuel cell 80. Because of this, at the time of a front collision, a component and a foreign matter easily collides with the motor MG before they approach the fuel cell 80. Accordingly, the motor MG receives part of a collision load, thereby restraining impact to be applied to the fuel cell 80.

Here, since a rotor rotating at a high speed is housed in the housing of the motor MG, its rigidity is designed to be relatively higher than the fuel cell 80. On this account, the placement of the front end portion Mf of the motor MG on the front side relative to the front end portion 80f of the fuel cell 80 is given priority to the restraint of the impact to the fuel cell 80 over the motor MG.

Further, as illustrated in FIG. 1, the fuel cell 80 is held in a posture inclined so that its upper part is placed on the front side relative to its lower part. Further, as described above, the brackets BR1 and BR2 of the mount mechanism M2 are connected rotatably around the fastening bolt B2 to some extent, the fastening bolt B2 extending generally in the vehicle width direction. Hereby, as illustrated in FIG. 10, due to a front collision, the fuel cell 80 is allowed to rotate with its lower side being as a supporting point. This secures a crash stroke, thereby making it possible to restrain the damage to the fuel cell 80.

Further, as illustrated in FIG. 10, the air conditioner condenser AC and the front bumper reinforcement 18 are crushed rearward due to a front collision, but the intake duct 40 is placed on the upper side relative to them. This restrains the air conditioner condenser AC and the front bumper reinforcement 18 from colliding with the intake duct 40, thereby making it possible to restrain the intake duct 40 from being largely deformed due to the front collision. This makes it possible to maintain a state where the intake duct 40 is fully closed by the air-intake shutter mechanism 60. Further, it is also possible to restrain the impact to be transmitted to the fuel cell 80 from the intake duct 40.

Further, the air conditioner condenser AC and the front bumper reinforcement 18 are placed on the lower side relative to the fuel cell 80 and on the front side relative to the motor MG and the transaxle TA. On this account, at the time of a front collision, the air conditioner condenser AC and the front bumper reinforcement 18 collide with the motor MG and the transaxle TA without colliding with the fuel cell 80. Because of this, the impact to be applied to the fuel cell 80 is also restrained. Further, the fan F is placed on the rear side relative to the fuel cell 80, and therefore, this also restrains the fan F from colliding with the fuel cell 80.

Figure 11:
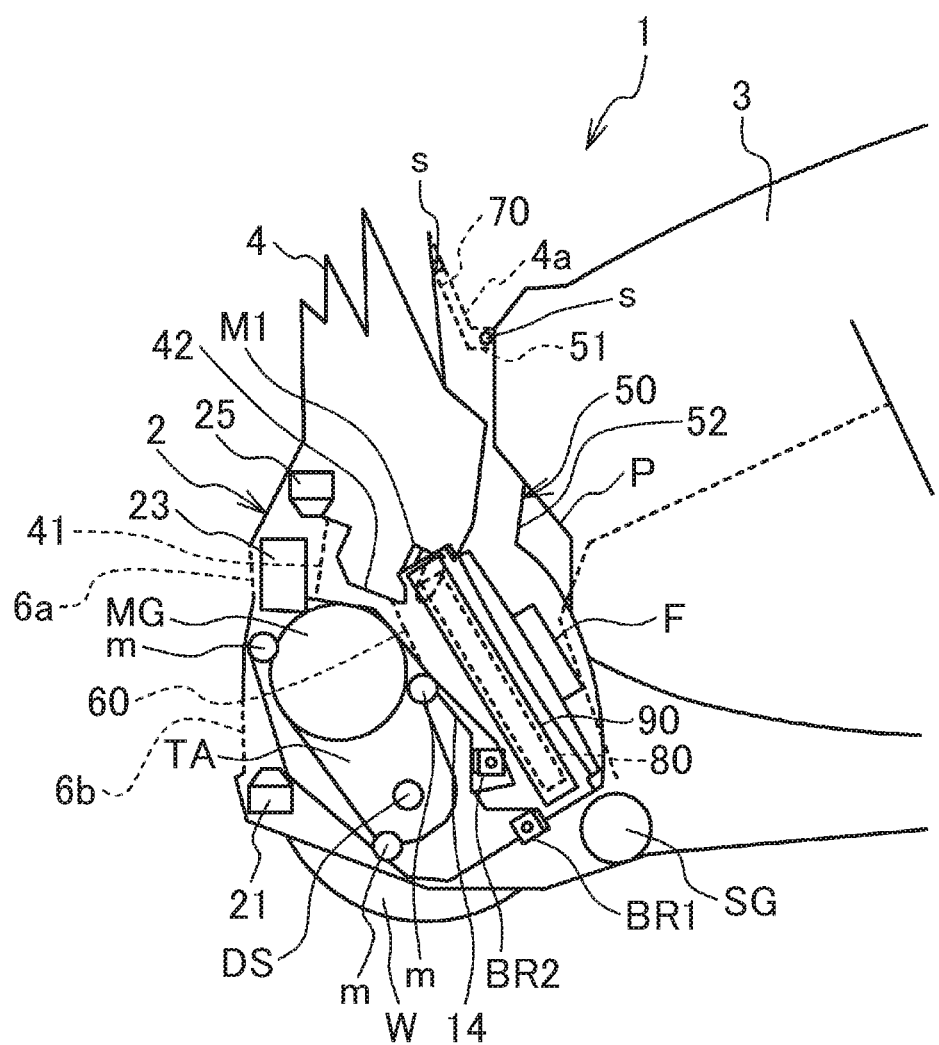
FIG. 11 is a schematic diagram of the internal structure of the vehicle on the front side at the time of a front collision with a collision load larger than a case of FIG. 10.

FIG. 11 is a schematic diagram of the internal structure of the vehicle 1 on the front side at the time of a front collision with a collision load larger than the case of FIG. 10. As described above, the mount mechanism M2 is broken more easily than the mount mechanism M1. Because of this, when a large collision load is applied to the front side of the vehicle 1, the mount mechanism M2 is broken, so that the brackets BR1 and BR2 are separated from each other. Hereby, the fuel cell 80 falls off from the cross member 14, so that the fuel cell 80 moves downward due to a gravitational action. Accordingly, the fuel cell 80 moves toward the lower side relative to the dash panel P and toward the lower side relative to the passenger compartment 3. This restrains the fuel cell 80 from colliding with the dash panel P and receiving large impact. Further, this also restrains the fuel cell 80 from entering the passenger compartment 3.

Figure 12:
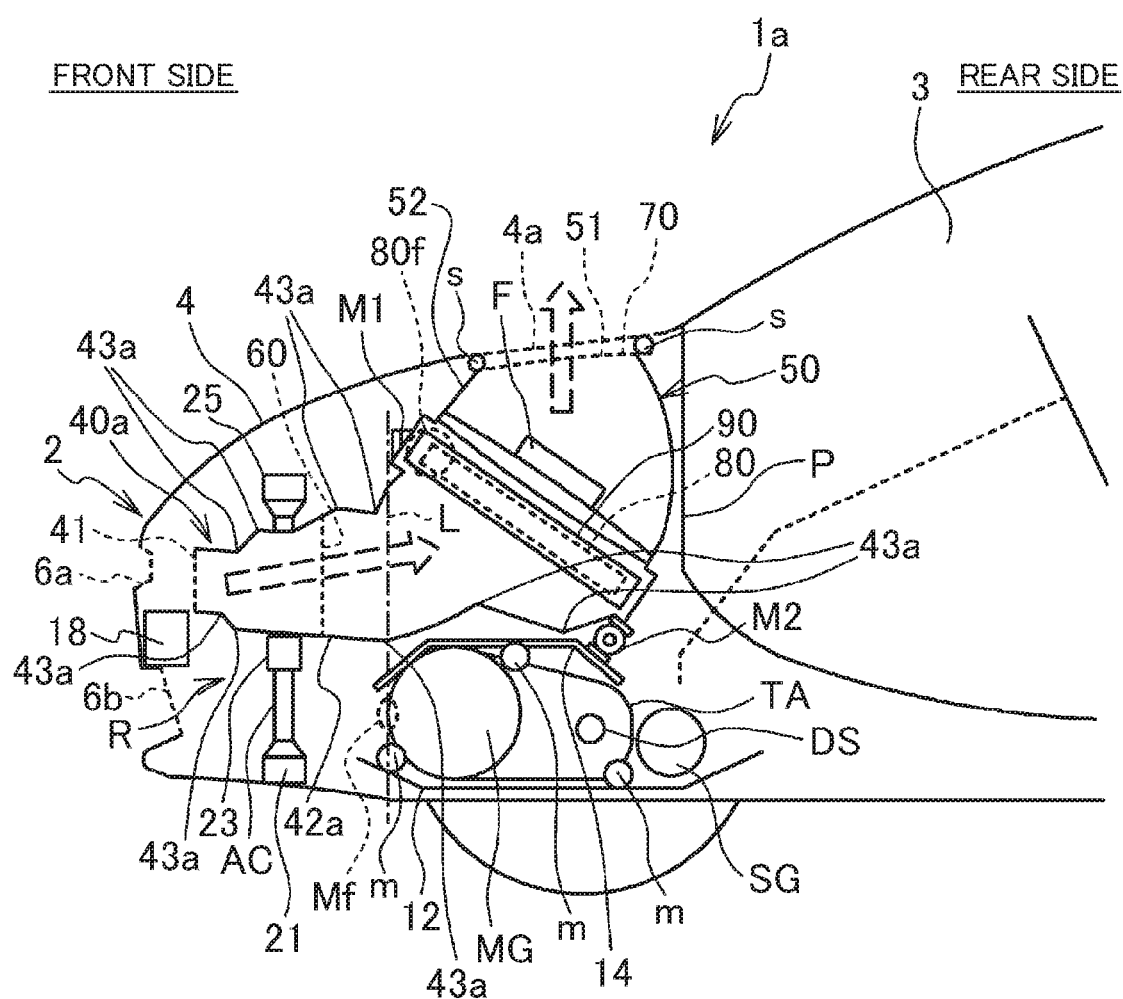
FIG. 12 is a schematic diagram of an internal structure of a vehicle on a front side in a first modification.

Next will be described a modification of the fuel-cell vehicle. Note that the same constituent as the above embodiment has the same reference sign, and a redundant description thereof is omitted. FIG. 12 is a schematic diagram of an internal structure of a vehicle 1a on a front side in a first modification. A plurality of bending portions 43a is provided in a metal plate portion 42a of an intake duct 40a. In the bending portion 43a, a wall portion of the intake duct 40a is bent. Note that the bending portion 43a illustrated in FIG. 12 is exaggerated.

Figure 13:
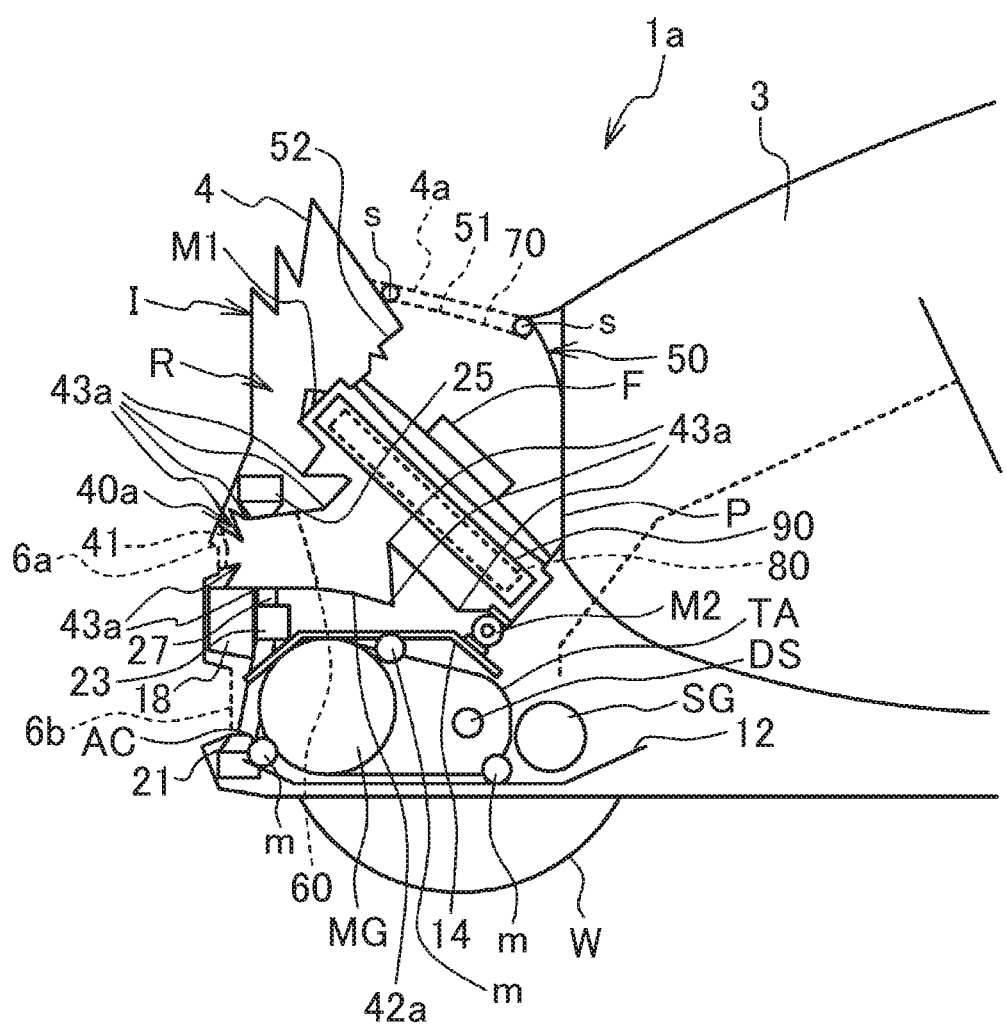
FIG. 13 is a schematic diagram of the internal structure of the vehicle on the front side in the first modification at the time of a front collision.

FIG. 13 is a schematic diagram of the internal structure of the vehicle 1a on the front side in the first modification at the time of a front collision. In a case where the vehicle 1a has a front collision, the intake duct 40a is deformed so as to be further bent at the plurality of bending portions 43a. Hereby, part of a collision load is used to bend the plurality of bending portion 43a. This further restrains the impact to be transmitted to the fuel cell 80 from the intake duct 40a.

Figure 14:
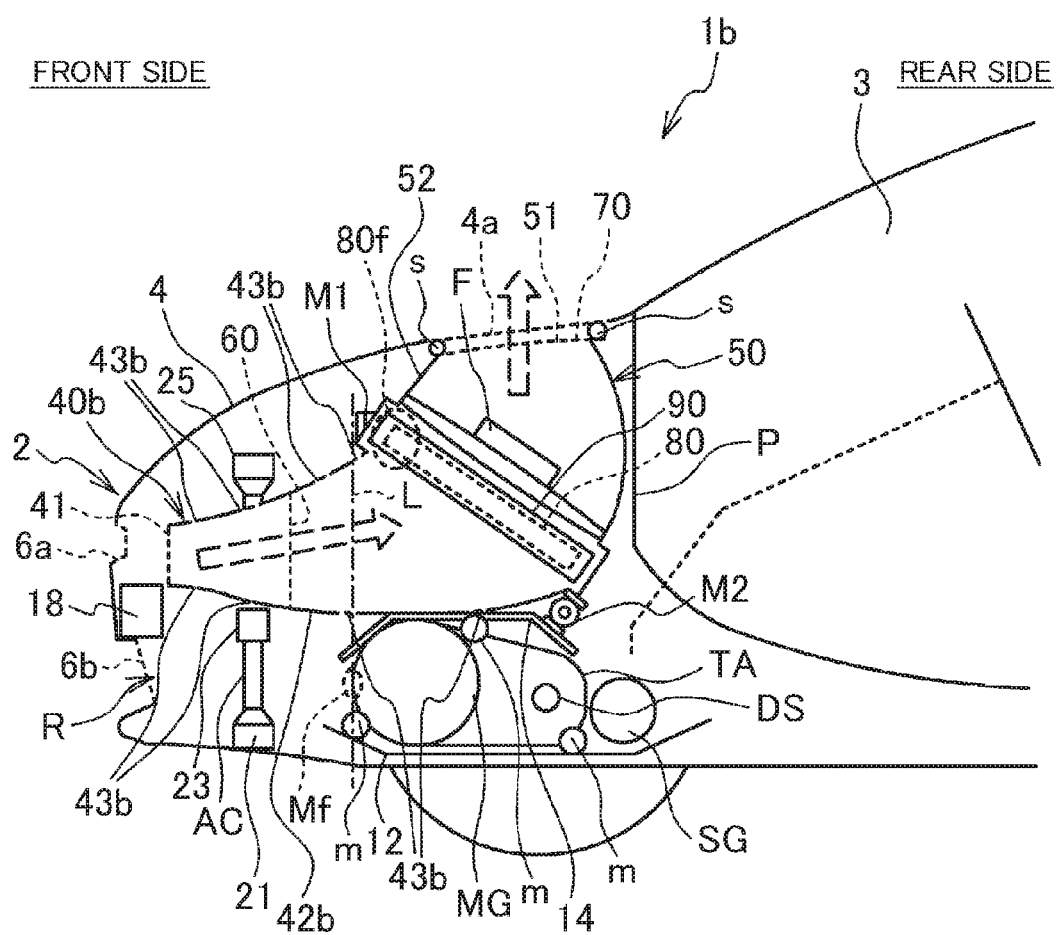
FIG. 14 is a schematic diagram of an internal structure of a vehicle on a front side in a second modification.

FIG. 14 is a schematic diagram of an internal structure of a vehicle 1b on a front side in a second modification. A plurality of thinned portions 43b is provided in a metal plate portion 42b of an intake duct 40b. The thinned portions 43b are formed to be thinner than a wall of the other part of the intake duct 40b. On this account, in a case where the vehicle 1b has a front collision, the intake duct 40b is deformed so as to be bent at the plurality of thinned portions 43b. Even according to such a configuration, impact transmitted to a fuel cell 80 is relaxed. Note that the thickness of the thinned portions 43b is a thickness to such a degree that the thinned portions 43b are not broken at the time of a front collision.

Figure 15:
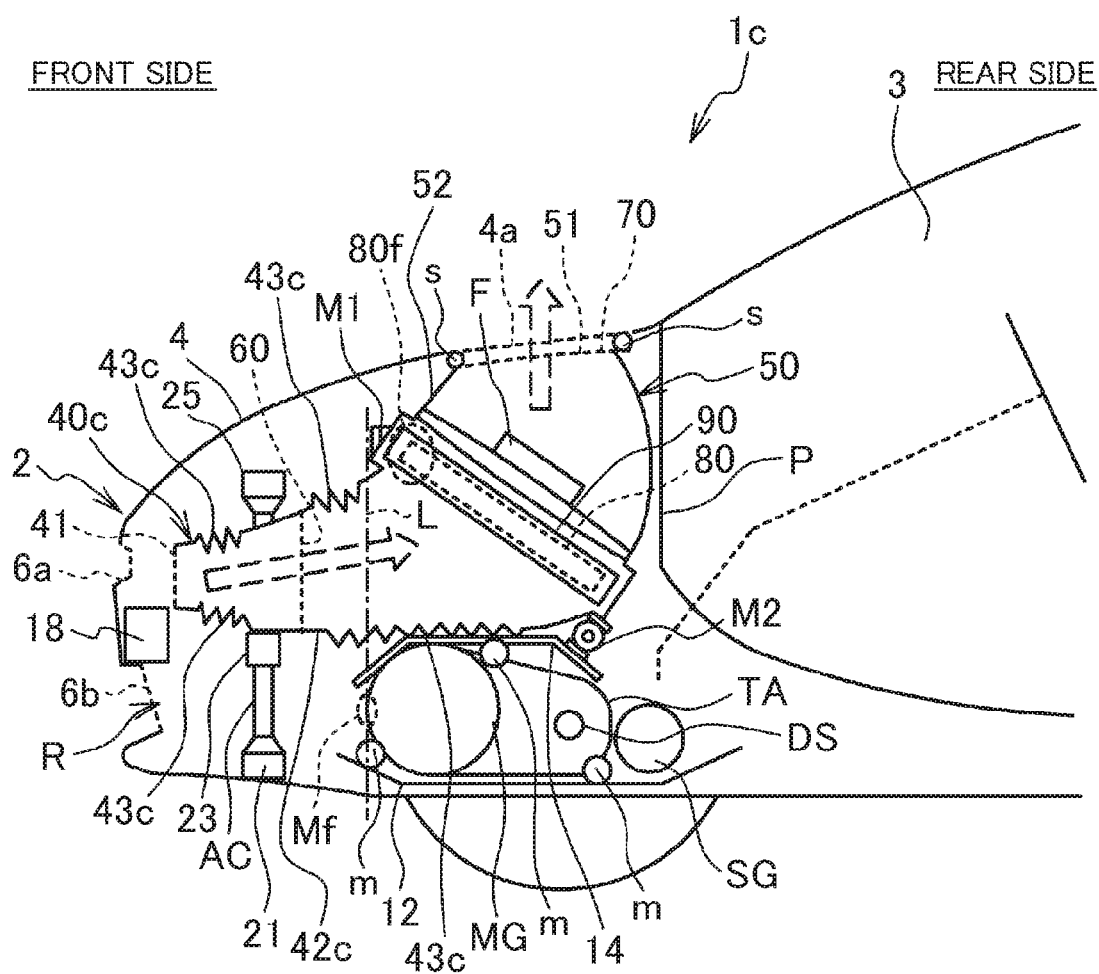
FIG. 15 is a schematic diagram of an internal structure of a vehicle on a front side in a third modification.

FIG. 15 is a schematic diagram of an internal structure of a vehicle 1c on a front side in a third modification. A plurality of bellows portions 43c is provided in a metal plate portion 42c of an intake duct 40c. The bellows portion 43c has a bellows shape. In a case where the vehicle 1c has a front collision, the intake duct 40c is deformed so that the plurality of bellows portions 43c contracts. Even with such a configuration, impact transmitted to a fuel cell 80 is relaxed. As described above, in the first to third modifications, the bending portion 43a, the thinned portion 43b, and the bellows portion 43c are examples of a deformation promoting portion that promotes the deformation of the intake duct at the time of a front collision.

The above embodiment and modifications deal with a configuration in which the deformation promoting portions are provided in the metal plate portions 42a to 42c of the intake ducts 40 to 40c, but a deformation promoting portion may be further provided in the metal plate portion 52 of the exhaust duct 50. In this case, it is possible to more preferably absorb the impact in a case where the impact load is large as illustrated in FIG. 11.

In the above embodiment and modifications, the entire intake ducts 40 to 40c and the entire exhaust duct 50 are each constituted by a metal plate portion, but the present disclosure is not limited to this. For example, at least one of the intake duct and the exhaust duct may be configured to include a metal casting portion and a metal plate portion. The metal casting portion is a fastening flange portion to be fastened to another component, for example, and the other tubular portion is constituted by the metal plate portion. In this case, it is necessary for the metal casting portion to secure rigidity, so the metal casting portion is thicker than the metal plate portion and can hardly deform. However, even in this case, since the metal plate portion is deformed more easily than the metal casting portion, part of a collision load is used for the deformation of the metal plate portion, thereby making it possible to relax the impact to the fuel cell 80.

Further, at least one of the intake ducts 40 to 40c and the exhaust duct 50 may be made of resin and at least partially include a resin portion having an elastomer component. Generally, on the occasion of receiving an impact load at the time of a front collision, the resin is easily broken or crushed without being deformed. However, the resin portion having the elastomer component is easily deformable. Accordingly, when the resin portion is deformed to absorb the impact load, it is possible to restrain at least one of the intake ducts 40 to 40c and the exhaust duct 50 from being broken. Examples of resin containing an elastomer component include thermoplastic elastomers of olefin, styrene, butadiene, isoprene, and the like, thermosetting elastomers of polyester, polyether, and the like, and rubber of fluorine, silicone, and the like.

For example, in a case where the intake ducts 40a to 40c are made of resin, it is desirable that at least the bending portion 43a, the thinned portion 43b, and the bellows portion 43c be formed in their resin portions made of the resin containing the elastomer component. This is because the deformation of such a resin portion due to a front collision is further promoted.

Figure 16:
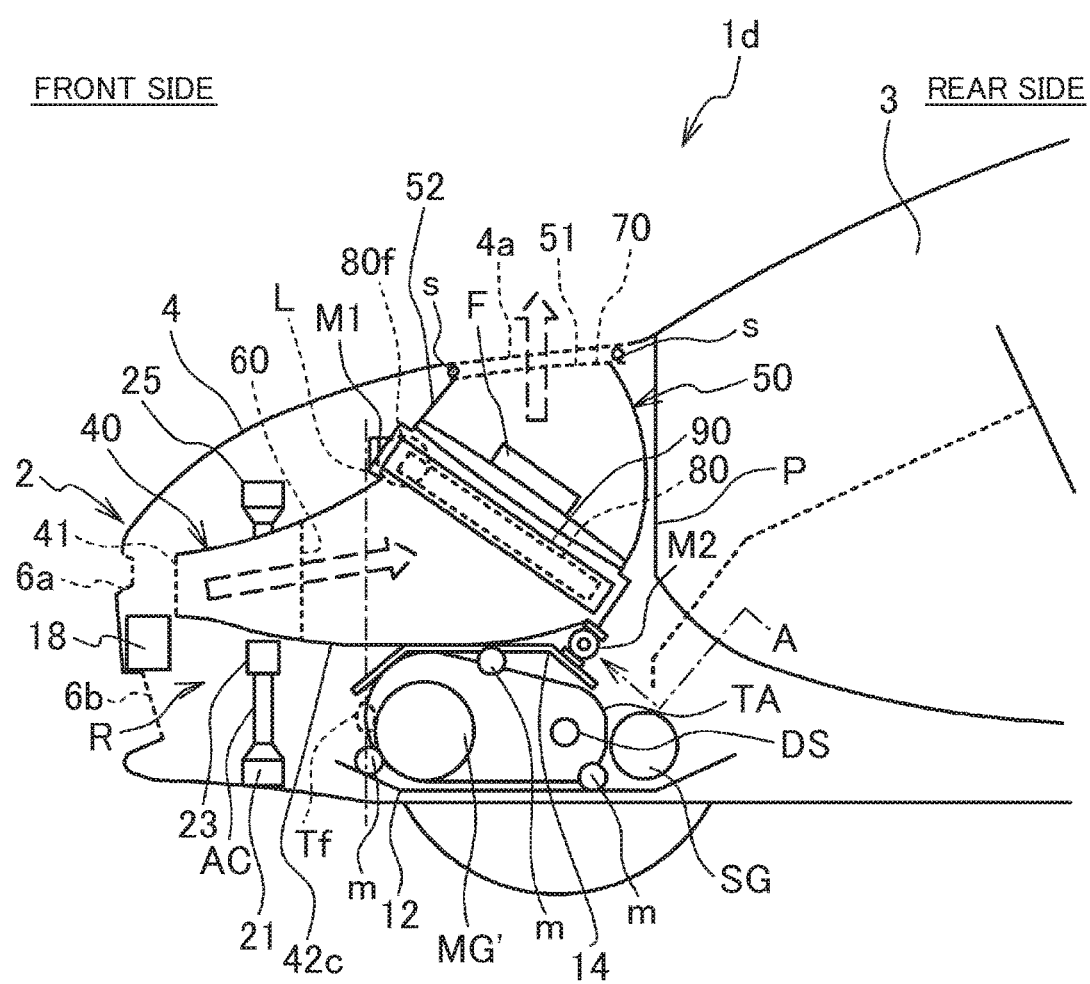
FIG. 16 is a schematic diagram of an internal structure of a vehicle on a front side in a fourth modification.

FIG. 16 is a schematic diagram of an internal structure of a vehicle 1d on a front side in a fourth modification. In the above embodiment and modifications, the front end portion Mf of the motor MG is placed on the front side relative to the front end portion 80f of the fuel cell 80. In the meantime, in the fourth modification, a front end portion Tf of a transaxle TA is placed on the front side relative to a front-side end portion of a motor MG' and on the front side relative to a front end portion 80f of a fuel cell 80. This is because a housing of the transaxle TA is designed to have a relatively higher rigidity than the fuel cell 80 so as to receive power from the motor MG' and a reaction force from a drive shaft DS. Accordingly, even in this case, at the time of a front collision, a component or a foreign matter collides with the transaxle TA first, thereby making it possible to restrain impact to be applied to the fuel cell 80.

The embodiment of the present disclosure has been described above in detail, but the present disclosure is not limited to the specific embodiment, and various modifications and alternations can be made.

In the above embodiment and modifications, the motors MG and MG' and the transaxle TA are accommodated in the storage chamber R, but the present disclosure is not limited to this. For example, the motors MG and MG' and the transaxle TA may be placed on the rear side relative to the passenger compartment 3, so as to drive the rear wheels.

In the above embodiment and modifications, the exhaust duct 50 and the air-exhaust shutter mechanism 70 are provided, but may not be provided. Even if they are not provided, the air that has passed through the fuel cell 80 can be discharged outside the storage chamber R through the ventilating hole 4a of the front hood 4.

In the above embodiment and modifications, the intake duct 40 is placed on the upper side relative to the air conditioner condenser AC, but the present disclosure is not limited to this. For example, the air conditioner condenser AC may be placed on the upper side relative to the intake duct 40 such that the air conditioner condenser AC is opposed to the ventilating hole 6a and the intake port 41 of the intake duct 40 is opposed to the ventilating hole 6b, or the air conditioner condenser AC and the intake port 41 of the intake duct 40 may be placed side by side in the vehicle width direction.

What is claimed is:

1. An air-cooled fuel-cell vehicle comprising:
    a drive motor for the vehicle;
    an air-cooled fuel cell configured to supply electric power to the motor;
    an intake duct placed on a vehicle front side relative to the fuel cell and configured to guide air to the fuel cell;
    an air-intake shutter mechanism configured to open and close the intake duct;
    a storage chamber provided on the vehicle front side relative to a passenger compartment of the vehicle and configured to accommodate the fuel cell, the intake duct, and the air-intake shutter mechanism;
    a controlling portion configured to control the air-intake shutter mechanism; and
    a collision detector configured to detect a front collision of the vehicle, wherein
    the controlling portion is configured to control the air-intake shutter mechanism to a closed position when the front collision of the vehicle is detected, and
    the intake duct includes a tubular metal plate portion or a resin portion containing an elastomer component.

2. The air-cooled fuel-cell vehicle according to claim 1, further comprising:
    an exhaust duct through which the air passing through the fuel cell is discharged to an upper side of the storage chamber relative to the fuel cell; and
    an air-exhaust shutter mechanism configured to open and close the exhaust duct, wherein
    the storage chamber accommodates the exhaust duct and the air-exhaust shutter mechanism, and
    the controlling portion is configured to control the air-exhaust shutter mechanism to a closed position when the front collision of the vehicle is detected.

3. The air-cooled fuel-cell vehicle according to claim 1, further comprising:
    a transaxle configured to transmit power of the motor to wheels of the vehicle, wherein
    the storage chamber accommodates the motor and the transaxle,
    an end portion, on the vehicle front side, of at least one of the motor and the transaxle is placed on the vehicle front side relative to an end portion of the fuel cell on the vehicle front side.

4. The air-cooled fuel-cell vehicle according to claim 2, wherein
the exhaust duct includes a tubular metal plate portion or a resin portion containing an elastomer component.

5. The air-cooled fuel-cell vehicle according to claim 1, further comprising:
a vehicle frame member constituting a framework of the vehicle;
an upper mount mechanism configured to fix the fuel cell to the vehicle frame member; and
a lower mount mechanism configured to fix the fuel cell to the vehicle frame member below the upper mount mechanism, wherein
the upper mount mechanism and the lower mount mechanism fix the fuel cell in an inclined posture so that an upper part of the fuel cell is placed on the vehicle front side relative to a lower part of the fuel cell, and
the lower mount mechanism includes a vulnerable portion configured to be broken more easily than the upper mount mechanism.

6. The air-cooled fuel-cell vehicle according to claim 1, further comprising:
a vehicle frame member constituting a framework of the vehicle;
an upper mount mechanism configured to fix the fuel cell to the vehicle frame member; and
a lower mount mechanism configured to fix the fuel cell to the vehicle frame member below the upper mount mechanism, wherein
the upper mount mechanism and the lower mount mechanism fix the fuel cell in an inclined posture so that an upper part of the fuel cell is placed on the vehicle front side relative to a lower part of the fuel cell,
the upper mount mechanism and the lower mount mechanism include first and second fastening bolts, respectively, the first and second fastening bolts each being configured to fasten a first bracket fixed to a fuel-cell side member with a second bracket fixed to the vehicle frame member, and
when the vehicle is viewed from a vertical direction, an axial direction of the second fastening bolt of the lower mount mechanism is parallel to a vehicle width direction of the vehicle as compared with an axial direction of the first fastening bolt of the upper mount mechanism.

7. The air-cooled fuel-cell vehicle according to claim 1, wherein
the metal plate portion of the intake duct or the resin portion of the intake duct includes a deformation promoting portion configured to be promoted to deform at a time when the vehicle has the front collision.

8. The air-cooled fuel-cell vehicle according to claim 1, further comprising
an air conditioner condenser accommodated in the storage chamber and configured to dissipate heat from air-conditioner refrigerant, wherein
the intake duct is placed on an upper side of the storage chamber relative to the air conditioner condenser.

9. The air-cooled fuel-cell vehicle according to claim 1, wherein
the air-intake shutter mechanism includes a frame body, and a plurality of fins extending along each other and supported rotatably by the frame body so as to open and close an opening of the frame body, and
the plurality of fins is made of metal.

10. The air-cooled fuel-cell vehicle according to claim 2, further comprising:
a front hood configured to open and close a top face of the storage chamber; and
an opening degree detector configured to detect opening and closing of the front hood, wherein
the controlling portion is configured to control the air-exhaust shutter mechanism to the closed position when it is detected that the front hood is opened.

11. The air-cooled fuel-cell vehicle according to claim 3, wherein
the intake duct and the fuel cell are placed on an upper side of the storage chamber relative to the motor and the transaxle.

12. An air-cooled fuel-cell vehicle comprising:
a drive motor for the vehicle;
an air-cooled fuel cell configured to supply electric power to the motor;
an intake duct placed on a vehicle front side relative to the fuel cell and configured to guide air to the fuel cell;
an air-intake shutter mechanism configured to open and close the intake duct;
a storage chamber provided on the vehicle front side relative to a passenger compartment of the vehicle and configured to accommodate the fuel cell, the intake duct, and the air-intake shutter mechanism;
an electronic control unit programmed to control the air-intake shutter mechanism; and
a collision detector configured to detect a front collision of the vehicle, wherein
the electronic control unit is programmed to control the air-intake shutter mechanism to a closed position when the front collision of the vehicle is detected, and
the intake duct includes a tubular metal plate portion or a resin portion containing an elastomer component.

* * * * *